United States Patent

Kondo et al.

[11] Patent Number: 5,946,044
[45] Date of Patent: Aug. 31, 1999

[54] IMAGE SIGNAL CONVERTING METHOD AND IMAGE SIGNAL CONVERTING APPARATUS

[75] Inventors: Tetsujiro Kondo; Yasuhiro Fujimori; Hideo Nakaya; Masashi Uchida, all of Kanagawa, Japan

[73] Assignee: Sony Corporation, Tokyo, Japan

[21] Appl. No.: 08/667,846

[22] Filed: Jun. 20, 1996

[30] Foreign Application Priority Data

Jun. 30, 1995 [JP] Japan .................................. 7-188472

[51] Int. Cl.⁶ .............................. H04N 7/01; H04N 11/00
[52] U.S. Cl. ........................ 348/458; 348/458; 348/409; 348/410
[58] Field of Search ..................... 348/458, 409, 348/410, 411, 412, 413, 407, 405, 402, 401, 400, 390, 384, 438, 394, 397, 399, 415, 416, 403, 404, 406, 408; 382/299, 300; H04N 7/01, 11/00

[56] References Cited

U.S. PATENT DOCUMENTS

| | | | |
|---|---|---|---|
| 5,008,748 | 4/1991 | Carr et al. ................................ | 348/417 |
| 5,253,058 | 10/1993 | Gharavi ................................... | 348/415 |
| 5,260,782 | 11/1993 | Hui ........................................... | 348/409 |
| 5,418,569 | 5/1995 | Ando ........................................ | 348/415 |
| 5,485,279 | 1/1996 | Yonemitsu .............................. | 348/411 |
| 5,675,387 | 10/1997 | Hoogenboom et al. ................. | 348/411 |

*Primary Examiner*—Andrew I. Faile
*Assistant Examiner*—Vivek Srivastava
*Attorney, Agent, or Firm*—Frommer Lawrence & Haug, LLP; William S. Frommer

[57] ABSTRACT

In an image signal converting method and an image signal converting apparatus, it is possible to perform a proper classification considering various signal characteristics of input image data and convert low-resolution input image data to high-resolution image data by using not only a classifying means 56 for classifying input images in accordance with the level distribution pattern of the input images but also a classifying means 50 for classifying input images in accordance with the movement of the input images and deciding the final class D32 of input image signals by both CLASS0 and CLASS1 obtained by both classifying means 50 and 56.

44 Claims, 32 Drawing Sheets

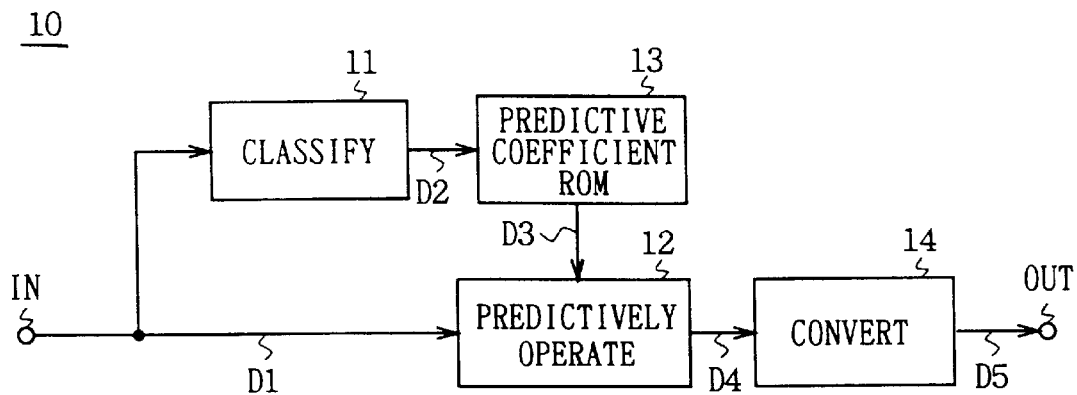
FIG. 4 (RELATED ART)
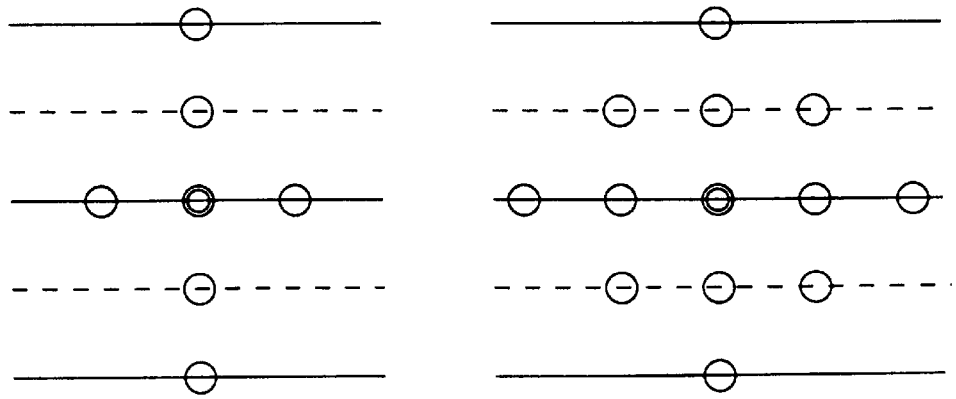
◎ : NOTICED SD PIXEL
○ : SD PIXEL
FIG. 5A
(RELATED ART)
FIG. 5B
(RELATED ART)

IMAGE SIGNAL CONVERTING METHOD AND IMAGE SIGNAL CONVERTING APPARATUS

BACKGROUND OF THE INVENTION

1. Field of the Invention

The present invention relates to an image signal converting method and an image signal converting apparatus, and is applicable to an up-converter for converting a standard resolution signal (hereinafter referred to as a standard definition (SD) image signal) of NTSC or the like to a high-resolution signal (hereinafter referred to as a high definition (HD) image signal) of high-vision or the like, an interpolating device for image signal for converting a sub-sampled signal to an original image signal, and the like.

2. Description of the Related Art

Though various pieces of digital equipment are released, a signal converting apparatus for realizing signal conversion between pieces of equipment is necessary for connection between pieces of equipment with different signal formats. For example, to display SD image data on an HD monitor, an up-converter for converting SD image data to HD image data is necessary.

In the case of this type of the up-converter, HD image data is generated by applying the frequency interpolation processing to SD image data with an interpolation filter and thereby, performing pixel interpolation. The interpolation processing is described below by referring to an example of spatial arrangement of SD and HD pixels shown in FIG. 1. In this connection, in FIG. 1, a continuous line represents a first field and a dotted line represents a second field. In FIG. 1, the number of HD pixels is two times larger than the number of SD pixels in horizontal and vertical directions respectively. When noticing the SD pixel shown by a symbol "⊚" in FIG. 1, four types of HD pixels mode1, mode2, mode3, and mode4 are present nearby the SD pixel. Therefore, the up-converter generates these four types of HD pixels mode1, mode2, mode3, and mode4 by means of frequency interpolation processing.

Some up-converters with a simple structure generate the above four types of the HD pixels mode1, mode2, mode3, and mode4 from field data of SD image data. The interpolation filter used for the above operation includes an in-space two-dimensional non-separable filter 1 shown in FIG. 2 and a horizontally/vertically separable filter 5 shown in FIG. 3.

The two-dimensional non-separable filter 1 generates four types of HD pixels mode1, mode2, mode3, and mode4 by independently interpolating these HD pixels with two-dimensional filters 2A to 2D and obtains HD image data by serializing the interpolation results in a selecting circuit 3. The horizontally/vertically separable interpolation filter 5 generates two scanning-line data values by performing processings for the HD pixels mode1 and mode3 with a vertical interpolation filter 6A and processings for the HD pixels mode2 and mode4 with a vertical interpolation filter 6B. Then, the filter 5 generates final four types of the HD pixels mode1, mode2, mode3, and mode4 by using horizontal interpolation filters 7A and 7B for each scanning line and obtains HD image data by serializing the HD pixels in a selecting circuit 8.

In the case of the above conventional up-converter, however, even if an ideal filter is used as the interpolation filter, the spatial resolution is the same as the case of an input SD image though the number of pixels increases so as to correspond to an HD format. Moreover, because the ideal filter cannot actually be used, there is the problem that it is impossible to generate an HD image with a resolution lower than that of an SD image.

To solve the above problem, an image signal converting apparatus and a method thereof applying the so-called classification adaptive processing method are proposed which obtains an HD pixel closer to a true value by classifying input SD image data values in accordance with a distribution of signal levels of the data values and performing predictive operation for each class with prediction coefficients previously obtained through learning. For example, such a method has been proposed in the specification and the drawings of Japanese Patent Application Laid-Open No. 5-328185, published on Dec. 10, 1993, corresponding to U.S. Pat. application Ser. No. 08/061,730, filed on May 17, 1993, by the present applicants.

An up-converter applying the classification adaptive processing is constituted as shown in FIG. 4. An up-converter 10 inputs input SD image data D1 to a classifying circuit 11 and a predictive operating circuit 12. The classifying circuit 11 sets a plurality of circumferential pixels about a noticed pixel to the input SD image data D1 (e.g. 8-bit pulse code modulation (PCM) data) as a classification pixel (hereinafter referred to as a classification tap) and generates a class data D2 in accordance with its waveform characteristic (level distribution pattern). In this connection, in FIGS. 5A and 5B, a continuous line represents a first field and a dotted line represents a second field.

In this case, to generate the class data D2 by the classifying circuit 11, the following methods are considered: a method of directly using PCM data (that is, a method of directly using PCM data as class data D2) and a method of decreasing the number of classes by using a compression method such as ADRC (Adaptive Dynamic Range Coding), DPCM (Differential Pulse Code Modulation), or VQ (Vector Quantization). In the above methods, the method of directly using PCM data as the class data D2 has the problem for practical use that the number of classes becomes a very large value of $2^{56}$ because 8-bit data equivalent to seven pixels is present when using, for example, classification taps consisting of seven pixels as shown in FIG. 5A.

Therefore, actually, the number of classes is decreased by a compression method such as ADRC. For example, when one-bit ADRC for compressing each pixel to one bit is applied to seven pixels set as classification taps, the number of classes can be decreased to 128 because the minimum value of seven pixels is removed in accordance with a dynamic range defined from seven-pixel data and then the pixel value of each tap is adaptively quantized by one bit. ADRC is developed as a signal compression method for an image signal, which is suitable to express the waveform characteristic of an input signal with a small number of classes.

The prediction coefficient data D3 previously obtained through learning is output from the prediction coefficient read only memory (ROM) 13 by using the class data D2 as a read address and supplied to the predictive operating circuit 12. The predictive operating circuit 12, as shown in FIG. 5B, sets a plurality of circumferential pixels about a noticed pixel as a predictive-operation pixel (hereinafter referred to as a prediction tap), and estimates and outputs HD image data D4 by using each pixel value constituting the prediction tap and the prediction coefficient data D3 and thereby, performing product-sum operation shown by the following equation (1). This HD image data D4 is supplied to a converting circuit 14 to be converted to time-sequential HD image data D5, and this is displayed on a screen which is not shown.

$$y' = \sum_{i=1}^{i=n} w_i \times x_i = w_1 \times x_1 + \cdots w_n \times x_n \tag{1}$$

In the equation (1), it is assumed that estimated HD pixel value is y', each prediction tap pixel value is $x_i$, and prediction coefficient is $w_i$. Moreover, in this case, "n" in the equation (1) comes to 13 because the number of pixels forming the prediction taps is 13 as shown in FIG. 5B.

In this case, the prediction coefficient data D3 for each class stored in the prediction coefficient ROM 13 is previously obtained through the learning using HD image data. The learning procedure is described below by referring to FIG. 6. After the learning procedure is started in step SP1, learning data is first generated by using an already-known HD image in order to learn a prediction coefficient in step SP2.

In step SP3, it is decided whether learning data necessary enough to obtain a prediction coefficient is collected. When it is decided that learning data is necessary, it proceeds to step SP4. When it is decided that sufficient learning data is obtained, it proceeds to step SP6. In step SP4, learning data is classified. This classification is performed in accordance with the processing same as that performed in the classifying circuit 11 (FIG. 4) of the up-converter 10 described the above. In this case, influence of noises is generally eliminated by excluding objects with a small data-change activity from learning objects.

Then, in step SP5, a normal equation is set up for each class in accordance with classified learning data. The processing in step SP6 is specifically described below. In this case, a case is described for generalization in which one pixel (HD pixel) to be interpolated is expressed by n SD pixels. First, the following equation (2) is set up by expressing the relation between each of pixel levels $x_1, \ldots, x_n$ of SD image data and the pixel level y of a noticed interpolation pixel in the form of a linear primary coupling equation of n taps according to prediction coefficients $w_1, \ldots, w_n$ for each class.

It is necessary to obtain the prediction coefficients $w_1, \ldots, w_n$ in the equation (2).

$$y' = \sum_{i=1}^{i=n} w_i \times x_i \tag{2}$$

A solution according to the method of least squares is considered to obtain the prediction coefficients $w_1, \ldots, w_n$. In the case of this solution, it is assumed that X is SD pixel data, W is a prediction coefficient, and Y is noticed interpolation pixel data to collect data so as to set up an observation equation of the following equation (3).

$$XW=Y$$

where $$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, W = \begin{bmatrix} x_1 \\ x_2 \\ \cdots \\ x_n \end{bmatrix}, Y = \begin{bmatrix} y_1 \\ y_2 \\ \cdots \\ y_m \end{bmatrix} \tag{3}$$

In the equation (3), m represents the number of learning data values and n represents the number of prediction taps (that is, n=13) to be set by the predictive operating circuit 12 (FIG. 4).

The following residual equation (4) is set up in accordance with the observation equation of the equation (3).

$$XW=Y+E$$

where $$X = \begin{bmatrix} e_1 \\ e_2 \\ \cdots \\ e_m \end{bmatrix} \tag{4}$$

From the equation (4), it is considered that the most probable value of each $w_i$ is obtained when a condition for minimizing the following equation (5) is effected.

$$\sum_{i=1}^{m} e_i^2 \tag{5}$$

That is, it is necessary to consider the condition of the following equation (6).

$$e_1 \frac{\partial e_1}{\partial w_i} + e_2 \frac{\partial e_2}{\partial w_i} + \cdots e_m \frac{\partial e_m}{\partial w_i} = 0 \tag{6}$$

$$(i = 1, 2, \ldots, n)$$

It is necessary to consider n conditions according to i of the equation (6) and calculate the prediction coefficients $w_1, \ldots, w_n$ to meet the n conditions. Therefore, the following equation (7) is obtained from the residual equation (4).

$$\frac{\partial e_i}{\partial w_1} = x_{i1}, \frac{\partial e_i}{\partial w_2} = x_{i2}, \ldots, \frac{\partial e_i}{\partial w_n} = x_{in} \tag{7}$$

$$(i = 1, 2, \ldots, m)$$

Moreover, the following equation (8) is obtained from the equations (6) and (7).

$$\sum_{i=1}^{n} e_i x_{i1} = 0, \sum_{i=1}^{m} e_i x_{i2} = 0, \ldots, \sum_{i=1}^{m} e_i x_{in} = 0 \tag{8}$$

Then, the normal equation of the following equation (9) can be obtained from the equations (4) and (8).

$$\begin{cases} \left(\sum_{j=1}^{m} x_{j1}x_{j1}\right)w_1 + \left(\sum_{j=1}^{m} x_{j1}x_{j2}\right)w_2 + \ldots + \left(\sum_{j=1}^{m} x_{j1}x_{jn}\right)w_n = \left(\sum_{j=1}^{m} x_{j1}y_j\right) \\ \left(\sum_{j=1}^{m} x_{j2}x_{j1}\right)w_1 + \left(\sum_{j=1}^{m} x_{j2}x_{j2}\right)w_2 + \ldots + \left(\sum_{j=1}^{m} x_{j2}x_{jn}\right)w_n = \left(\sum_{j=1}^{m} x_{j2}y_j\right) \\ \vdots \\ \left(\sum_{j=1}^{m} x_{jn}x_{j1}\right)w_1 + \left(\sum_{j=1}^{m} x_{jn}x_{j2}\right)w_2 + \ldots + \left(\sum_{j=1}^{m} x_{jn}x_{jn}\right)w_n = \left(\sum_{j=1}^{m} x_{jn}y_j\right) \end{cases} \quad (9)$$

Because the normal equation of the equation (8) is n simultaneous equations having n unknowns, it is possible to obtain the most probable value of each $w_i$ from the n simultaneous equations. Actually, the simultaneous equations are solved by the sweeping-out method (elimination method of Gauss-Jordan).

In the case of the prediction learning procedure in FIG. 6, a loop of steps SP2-SP3-SP4-SP5-SP2 is repeated until normal equations equal to the number of unknowns n are set up in order to obtain undetermined coefficients $w_1, \ldots, w_n$ for each class. When a necessary number of normal equations are obtained in the above manner, an affirmative result is obtained in step SP3 and prediction-coefficient determination is started in step SP6.

In step SP6, the normal equation of the equation (9) is solved to determine the prediction coefficients $w_1, \ldots, w_n$ for each class. The prediction coefficients thus obtained are entered in storage means such as a ROM (that is, the prediction coefficient ROM 13 (FIG. 4)) which is address-divided for each class in the next step SP7. Prediction coefficient data for classification adaptive processing is generated by the above learning and the prediction learning procedure is terminated in the next step SP8.

A learning circuit 20 shown in FIG. 7 is considered as hardware structure for realizing the prediction learning processing. The learning circuit 20 converts HD image data to SD image data through a vertical thinning filter 21 and a horizontal thinning filter 22 and supplies the SD image data to a classifying circuit 23. In this case, the classifying circuit 23 has the same structure as the classifying circuit 11 of the above-described up-converter 10 (FIG. 4), sets a classification tap from the SD image data, and generates class data D2' in accordance with the waveform characteristic of the tap. The classifying circuit 23 is a circuit for executing the class determination processing (step SP4) in FIG. 6. The classifying circuit 23 transmits the generated class data D2' to a coefficient selecting circuit 24.

The coefficient selecting circuit 24 is a circuit for setting up a normal equation and moreover determining a prediction coefficient. That is, the coefficient selecting circuit 24 sets up the normal equation of the equation (9) for each class shown by the class data D2 by using the SD image data and HD image data and obtains a prediction coefficient from the normal equation. Then, the circuit 24 stores the obtained prediction coefficient in a corresponding class address of the prediction coefficient ROM 13.

However, to generate HD image data by the classification adaptive processing, there is a problem that the prediction accuracy by an up-converter is deteriorated unless a proper classification processing is performed in accordance with the feature of input SD image data when generating a prediction coefficient through learning. That is, to predict HD image data closer to a true value, it is important to collect only SD image data with a similar characteristic to generate each class and learn HD image data corresponding to each class as a teacher signal.

However, when the classification capacity is insufficient, HD image data which should originally be classified into different classes is classified into the same class. Therefore, a prediction coefficient obtained through learning is obtained from an average value of HD image data with different properties. As a result, an up-converter for predicting an HD image signal by using the prediction coefficient has a problem that a resolution creating capacity is deteriorated.

SUMMARY OF THE INVENTION

In view of the foregoing, an object of the present invention is to provide an image signal converting method and an image signal converting apparatus capable of converting low-resolution image data to higher-resolution image data by performing a proper classification adaptive processing considering various signal characteristics of input image data.

The foregoing object and other objects of the present invention have been achieved by the provision of an image signal converting apparatus for converting a first input image signal to a second image signal different from said first image signal, comprising: a class code deciding means for deciding the class of noticed pixels in accordance with the movement and patterns of the circumference of noticed pixels in said first input image signal, and generating a class code showing the class; a predictive coefficient storage means for storing predictive coefficient data serving as the information for converting said first input image data to said second input image data for each class code to output said predictive coefficient data corresponding to said class code; and a predictive operating means for generating said high-resolution image data by using the predictive coefficient data output from said predicative coefficient storage means correspondingly to said class code and a plurality of pixels spatially and/or temporally present at the circumference of said noticed pixels and thereby performing predictive operation, and an image signal converting method corresponding to the above apparatus.

That is, the present invention does not only classifies an input image in accordance with the level distribution pattern of the input image but also classifies the input image in accordance with the movement of the input image to generate a class code.

Further, in the present invention, the class code deciding means, comprises: a first classifying means for deciding the first class of said noticed pixels in accordance with the movement of the circumference of said noticed pixels in said first input image data to output a first class code showing the first class; and a second classifying means for deciding the second class of said noticed pixels in accordance with level distribution patterns of a plurality of pixels spatially and/or temporally present at the circumference of said noticed pixels to output a second class code showing the second class; wherein a class code is generated based on said first class code and said second class code.

Also, in the present invention, said first input image signal is a low-resolution image signal and said second image signal is a higher-resolution image signal than said first input image signal.

In the present invention, said second image signal is an image signal having larger number of pixels than said first image signal.

Further, an image signal converting apparatus and an image signal converting method according to the present invention include a classified pixel selecting means or a step for adaptively selecting said pixels used for deciding the second class by said second classifying means corresponding to said first class code.

That is, the pixels used for classifying an input image in accordance with the level distribution pattern of the input image are adaptively selected in accordance with the movement of the input image.

Moreover, an image signal converting apparatus and an image signal converting method in the present invention include a predictively-operated pixel selecting means or a step for adaptively selecting said pixels used for predictive operation by said predictive operating means corresponding to said first class code.

That is, the pixels used for predictive operation are adaptively selected in accordance with the movement of the input image.

Therefore, by deciding the final class of the input image signal in accordance with the level distribution pattern of the input image and the movement of the input image, a class more reflecting the characteristics of the input image can be formed comparing with the case where an input image is simply classified in accordance with the level distribution pattern of the input image.

The pixels used for classifying an input image in accordance with the level distribution pattern of the input image are adaptively selected in accordance with the movement of the input image, so that the classified result in which the characteristics of the input image are more reflected can be obtained.

Furthermore, the pixels used for predictive operation are selected in accordance with the movement of the input image so that predictive operation can be performed by using only pixels which are important in practical, thus high-accurate predictive operation result can be obtained with less number of pixels.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a block diagram showing the structure of an up-converter using classification adaptive processing;

FIGS. 5A and 5B are schematic diagrams showing an arrangement of classification taps and an arrangement of prediction taps;

DETAILED DESCRIPTION OF THE EMBODIMENT

Preferred embodiments of the present invention will be described with reference to the accompanying drawings:

(1) First Embodiment (1-1) General Structure

Figure 8:
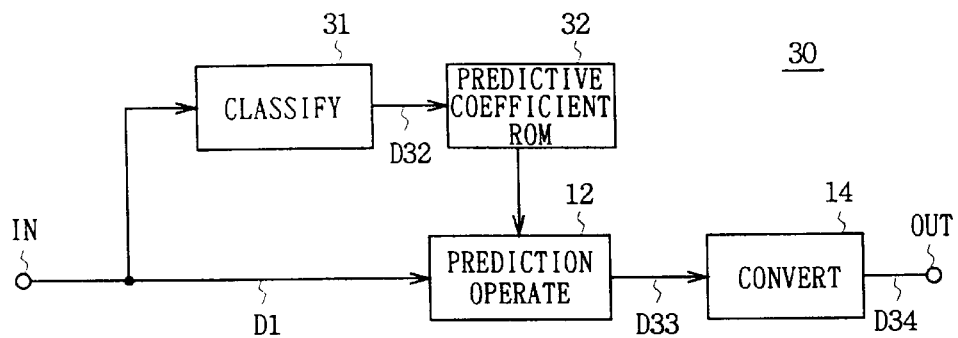
FIG. 8 is a block diagram showing the structure of the up-converter of an embodiment of the present invention.

FIG. 8 shows the first embodiment of an up-converter 30 to which the present invention is applied. The up-converter 30 supplies an input SD image data D1 to a classifying circuit 31 and a predictive operating circuit 12. The classifying circuit 31 detects an amount of movement of an input image in accordance with the input SD image data D1, performs classification by considering the amount of movement, and generates class data which corresponds to the classification. In brief, the classifying circuit 31 can perform classification more accurately in accordance with features of input SD image signals. The classifying circuit 31 transmits class data D32 thus obtained to a prediction coefficient ROM 32.

Figure 1:
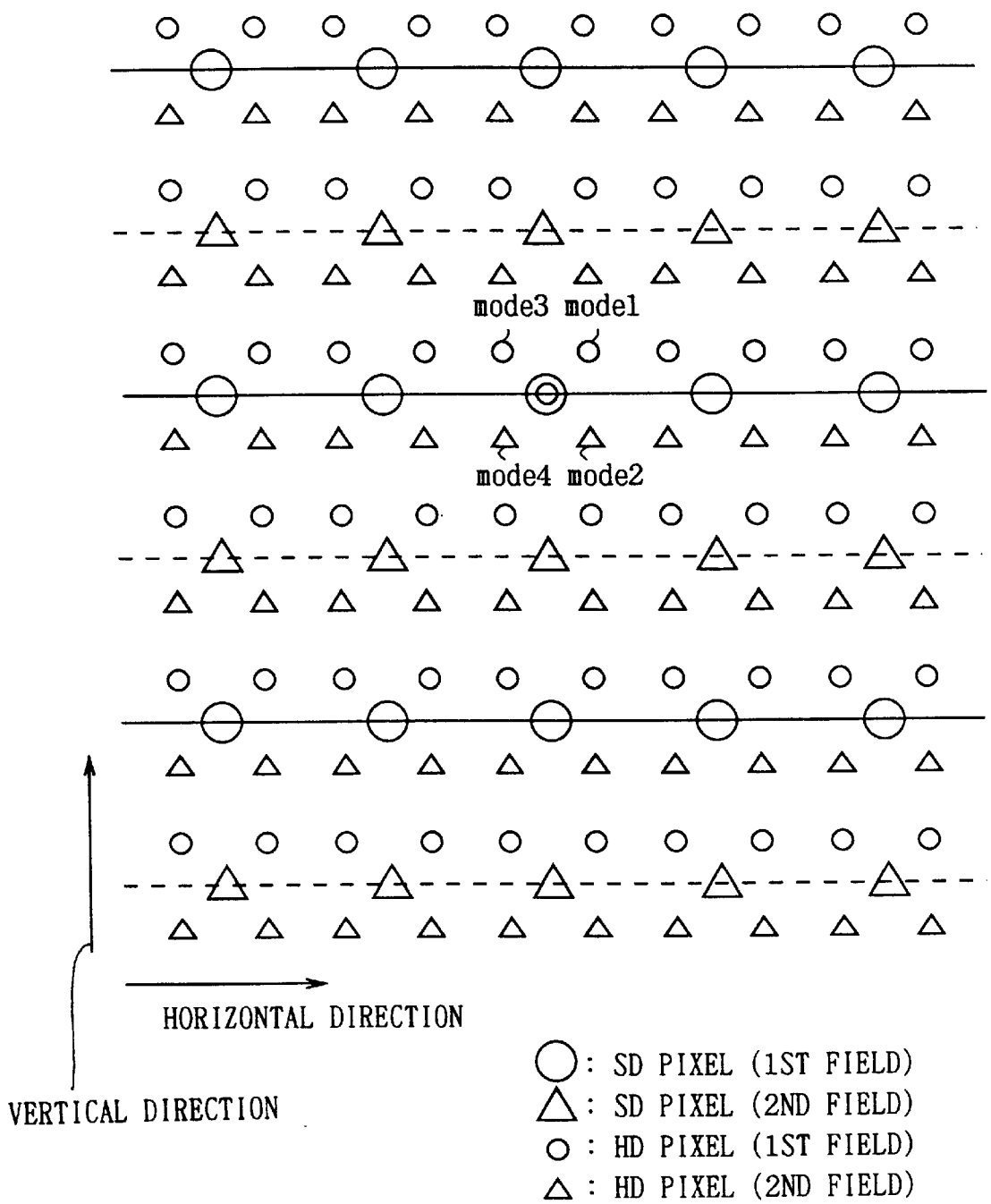
FIG. 1 is a schematic diagram showing a spatial arrangement of SD pixel and HD pixel for explaining a conventional example.
Figure 2:
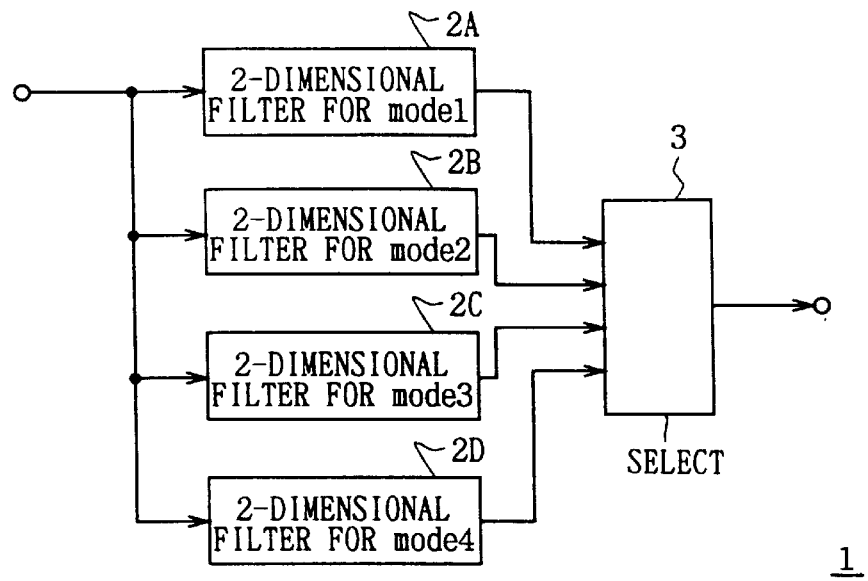
FIG. 2 is a block diagram showing the structure of a conventional two-dimensional non-separable interpolation filter.
Figure 3:
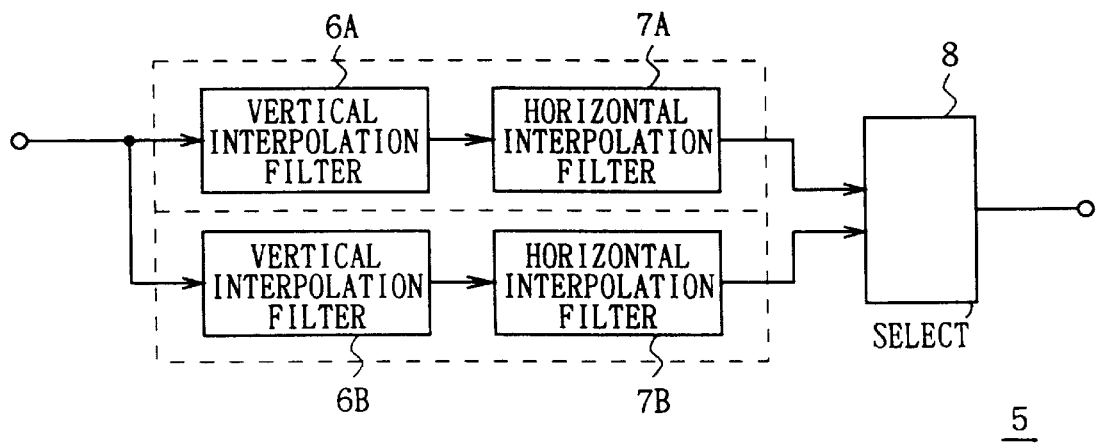
FIG. 3 is a block diagram showing the structure of a conventional horizontally/vertically separable interpolation filter.
Figure 6:
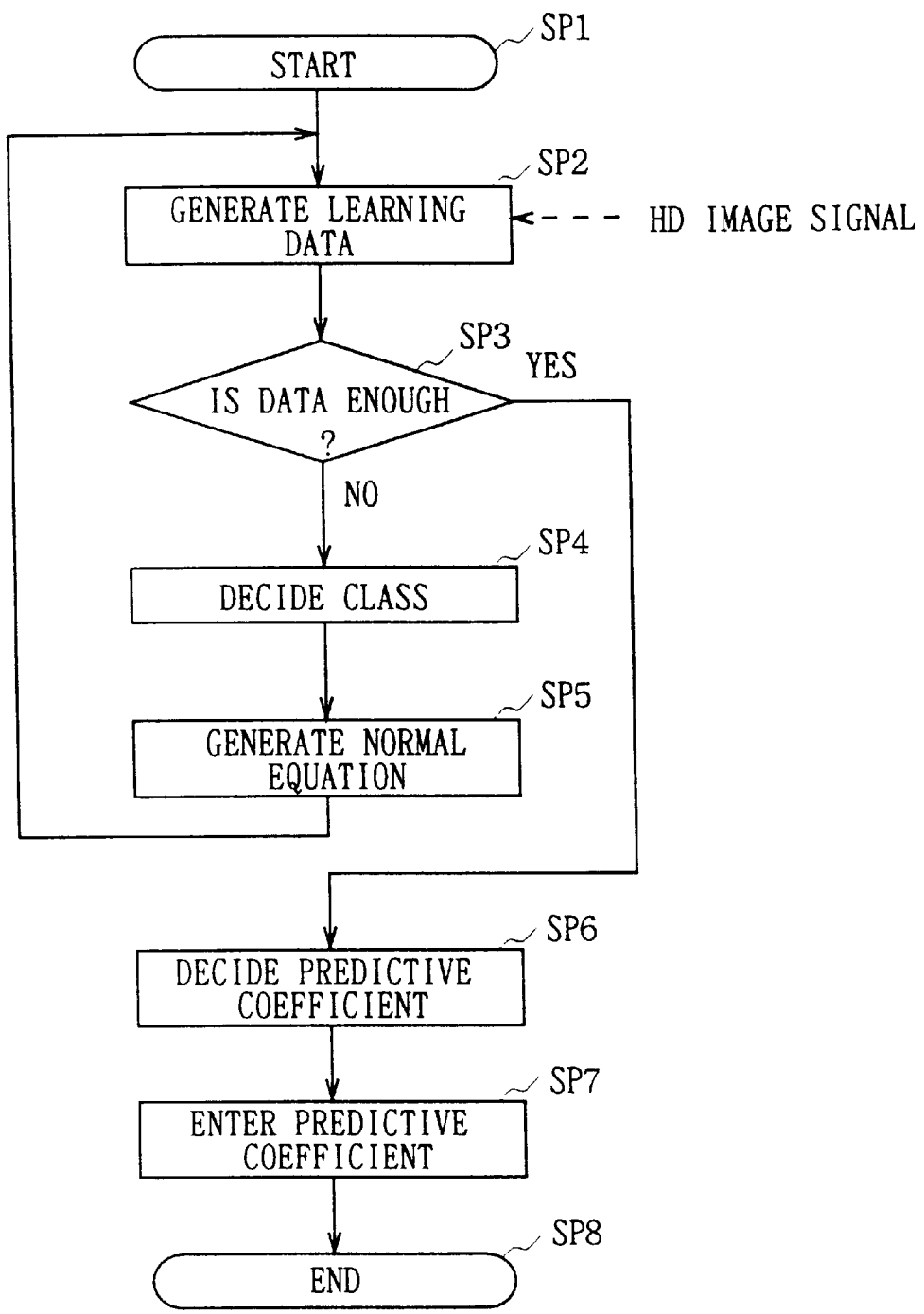
FIG. 6 is a flow chart showing a prediction coefficient learning procedure.
Figure 7:
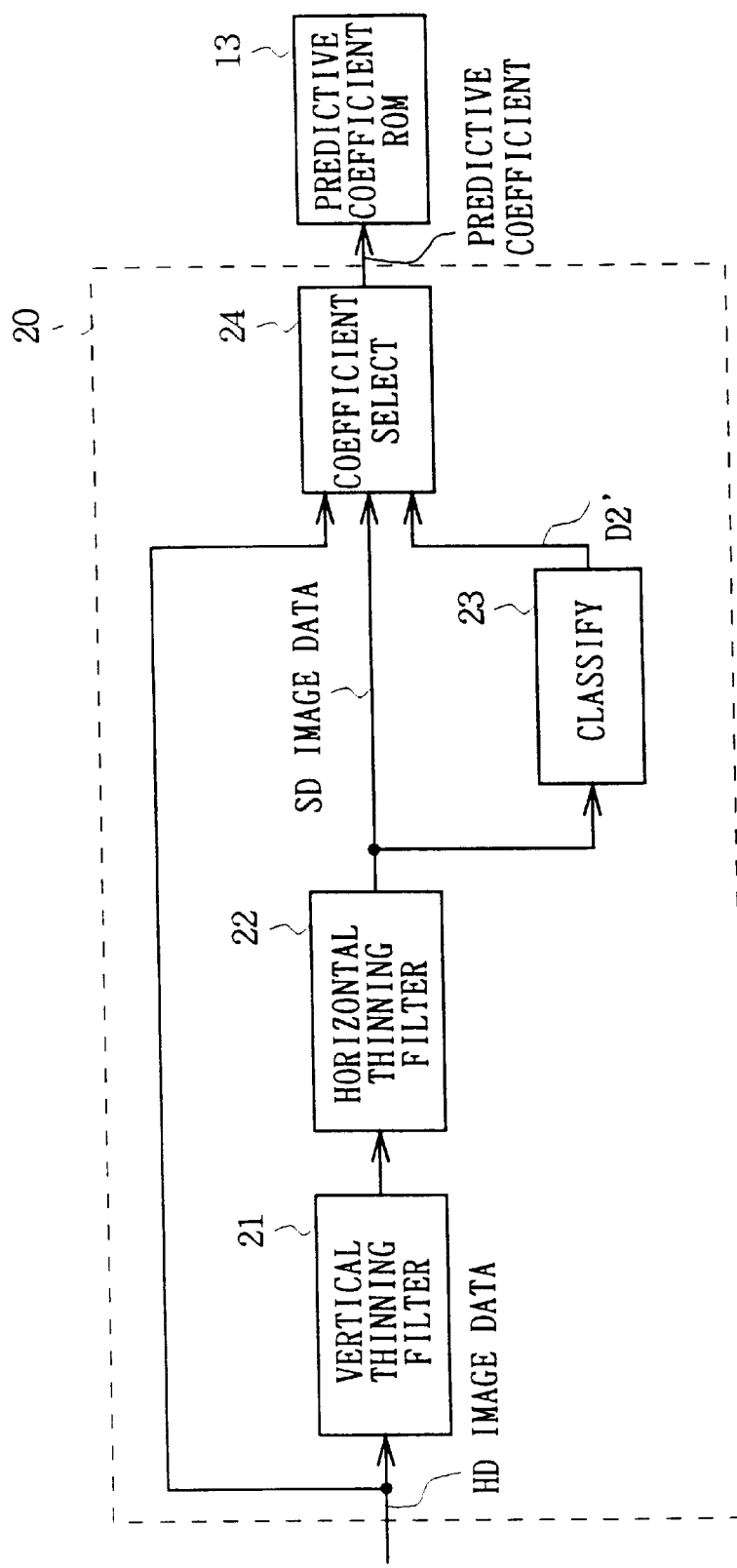
FIG. 7 is a block diagram of the structure of a learning circuit for obtaining a prediction coefficient.

The prediction coefficient ROM 32 stores a prediction coefficient obtained through learning for each class classified by considering the amount of movement of an image similarly to the classification by the classifying circuit 31. The prediction coefficient for each class is stored corresponding to four types of generated HD pixels mode1, mode2, mode3, and mode4, shown in FIG. 1, respectively. The prediction coefficient ROM 32 comprises a learning circuit 40 shown in FIG. 9. That is, in FIG. 9 in which a portion corresponding to a portion in FIG. 7 is provided with the same symbol, the learning circuit 40 has a classifying circuit 41 of the same structure as the classifying circuit 31 of the up-converter 30 (FIG. 8) and classifies SD image data by the classifying circuit 41 while considering an amount of movement. A coefficient selecting circuit 24 calculates a prediction coefficient for each class classified by the classifying circuit 41 by using the above-described normal equation. In this case, the prediction coefficient for each class is calculated corresponding to four types of HD pixels mode1, mode2, mode3, and mode4, respectively. Then, the prediction coefficient is stored in the prediction coefficient ROM 32.

Thus, because the learning circuit 40 is constituted so as to classify SD image by considering the movement of images and obtain a prediction coefficient for each class, the circuit 40 can perform classification further reflecting features of images compared with a case of classifying SD images in accordance with only the level distribution pattern shape of the SD images. As a result, the accuracy of a prediction coefficient can be improved because it is possible to obtain a prediction coefficient for each class by collecting prediction coefficients with a similar characteristic.

Moreover, the up-converter 30 read out thus obtained accurate prediction coefficient corresponding to the class data D32 obtained from the classifying circuit 31. Thus read-out prediction coefficient used to generate the four types of HD pixels mode1, mode2, mode3, and mode4 is supplied to the predictive operating circuit 12. Also, the input SD image data which has been supplied through a delay circuit, not shown in FIG., is supplied to the predictive operating circuit 12. Then, the predictive operating circuit 12 performs predictive operation by using the prediction coefficient and the input SD image data. Therefore, it is possible to generate .HD interpolation pixel data D33 which is formed by four types of HD pixels mode1, mode2, mode3, and mode4 closer to a true value. This HD interpolation pixel data D33 is supplied to a converting circuit 14 to be converted to time-sequential HD image data and then displayed on screen. Thereby, higher-resolution HD image data D34 can be obtained comparing with conventional methods. Note that, in the embodiment, it has been described about a method using a learning circuit 40 as a method for generating a prediction coefficient, however, the present invention is not limited to this, but may generate a prediction coefficient by a computer, or the like, using the flow chart shown in FIG. 10. Such a processing can be performed also in embodiments described hereinafter.

(1-2) Structure of Classifying Unit

Figure 10:
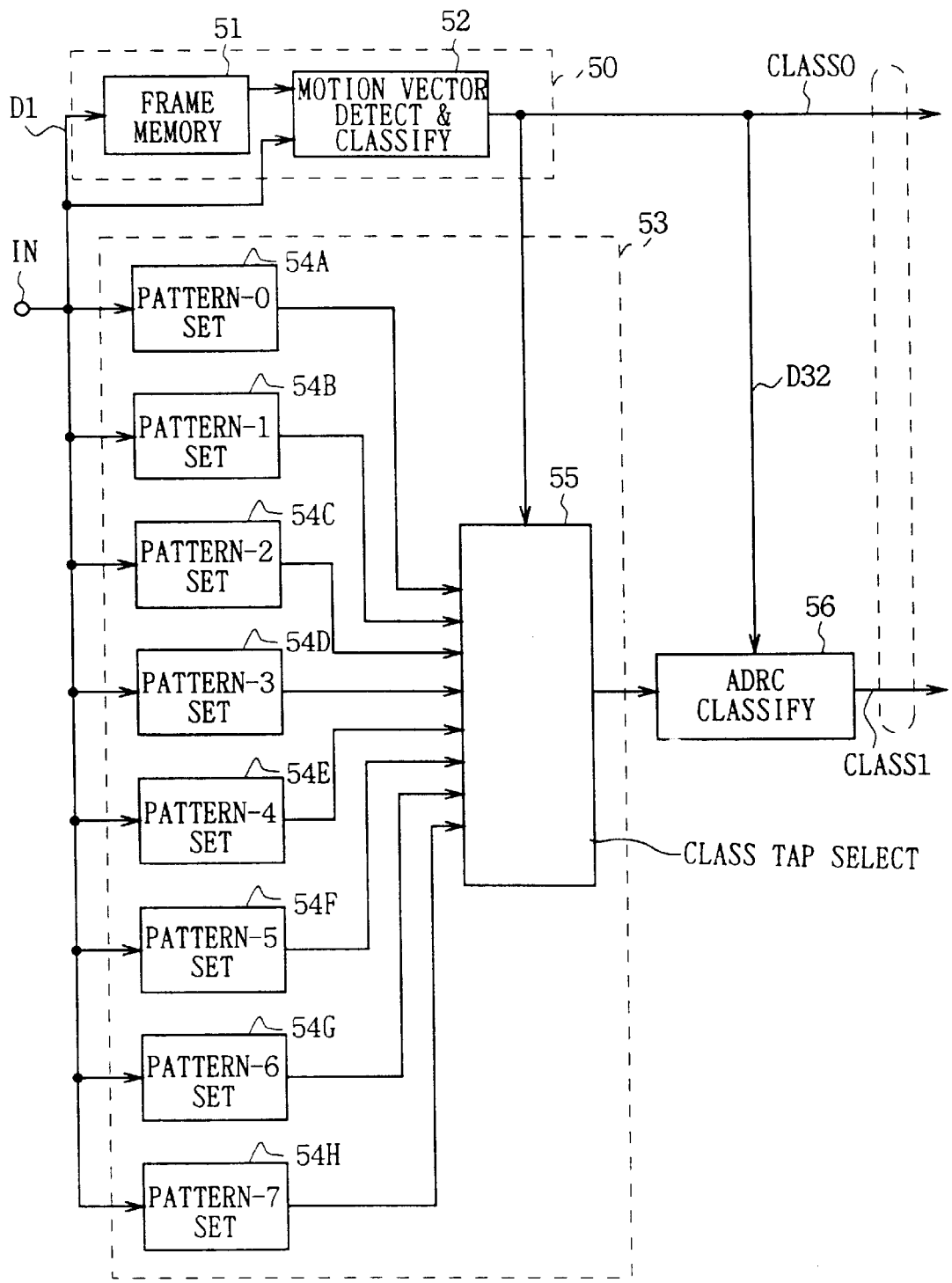
FIG. 10 is a block diagram showing the structure of the classifying circuit according to the first embodiment.

The classifying circuits 31 and 41 are constituted as shown in FIG. 10. In this case, the classifying circuit 31 is described below because the classifying circuit 41 has the same structure as the classifying circuit 31. The classifying circuit 31 inputs the SD image data D1 to a frame memory 51 and a motion vector detecting and classifying circuit 52 which constitute first classifying unit 50 and also inputs the data D1 to a plurality of pattern setting circuits 54A to 54H of a classified pixel selecting circuit 53.

The motion vector detecting and classifying circuit 52 detects motion vectors around a noticed pixel in the SD image data D1 by using the SD image data of the last frame and the SD image data of the present frame supplied from the frame memory 51 and outputs a motion class code CLASS0 in accordance with the detection result. The motion vector detecting and classifying circuit 52 classifies motion vectors into 8 types in accordance with an area of AR0 to AR6 or AR7 in FIG. 11 where a motion vector is present and generates the motion class code CLASS0 showing the type of a detected motion vector. Therefore, the motion class code CLASS0 is 3-bit data. Moreover, this embodiment of the motion vector detecting and classifying circuit 52 uses the block matching method as a motion vector detecting method.

The motion class code CLASS0 is directly transmitted to the prediction coefficient ROM 32 at the rear stage and also transmitted to a class tap selecting circuit 55. The class tap selecting circuit 55 receives a plurality of classification taps from the pattern setting circuits 54A to 54H, selects a classification tap corresponding to the motion class code CLASS0 out of these classification taps, and outputs the classification tap to an ADRC classifying circuit 56 serving as second classifying means.

For an input SD image whose amount of movement is almost close to zero, a classification tap is selected which can perform classification in accordance with a signal change as close to the space-time continuum of a noticed pixel as possible in the ADRC classifying circuit 56 serving as second classification means. For an input SD image having a large amount of movement, however, a classification tap is selected which can perform classification in accordance with a large signal change in a wide area. Moreover, for an SD image having an intermediate amount of movement, a classification tap is selected which can perform classification with a classification sensitivity raised in a moving direction.

Classification tap data output from the class tap selecting circuit 55 is supplied to the ADRC classifying circuit 56 for classifying noticed pixels in accordance with the level distribution pattern of pixels around the noticed pixels. The ADRC classifying circuit 56 adaptively re-quantizes the classification tap data in accordance with the dynamic range of the data and generates an ADRC class code CLASS1 having less number of classes. Moreover, an ADRC classifying circuit 54 can further reflect the waveform change of an SD image on the ADRC class code CLASS1 by switching the numbers of pixels used to define a dynamic range (DR) in accordance with the motion class code CLASS0 when re-quantizing the data.

The ADRC classifying circuit 56 of the first embodiment generates an ADRC class code CLASS1 of 256 classes (8 bits) by applying one-bit ADRC processing to classification tap data (8 bits per pixel) supplied from the class tap selecting circuit 55 and thereby adaptively re-quantizing each pixel value to one bit.

Thus, the classifying circuit 31 obtains the motion class code CLASS0 by using a plurality of pixels around noticed pixels to be classified to detect motion vectors and classifying the noticed pixels in accordance with the motion vectors. Then, the circuit 31 outputs the combination of the motion class code CLASS0 and the ADRC class code CLASS1 which is a classification result based on the level distribution pattern around the noticed pixels as the final class code D32. In the case of the first embodiment, because the motion class code CLASS0 is 3 bits and the ADRC class code CLASS1 is 8 bits, the final class code D32 comes to 11 bits (2048 class) and 11 bits serve as the number of addresses of the prediction coefficient ROM 32 (FIG. 8).

Then, the pattern setting circuits 54A to 54H of the classified pixel selecting means 53 are described below. Each of the pattern setting circuits 54A to 54H sets a pixel pattern corresponding to the type of a motion vector. The first embodiment is provided with eight pattern setting circuits 54A to 54H so as to set eight types of pixel patterns corresponding to eight types of movement. That is, each of the pattern setting circuits 54A to 54H sets a pixel pattern corresponding to each motion vector to eight areas AR0 to AR7 shown in FIG. 11.

Figure 11:
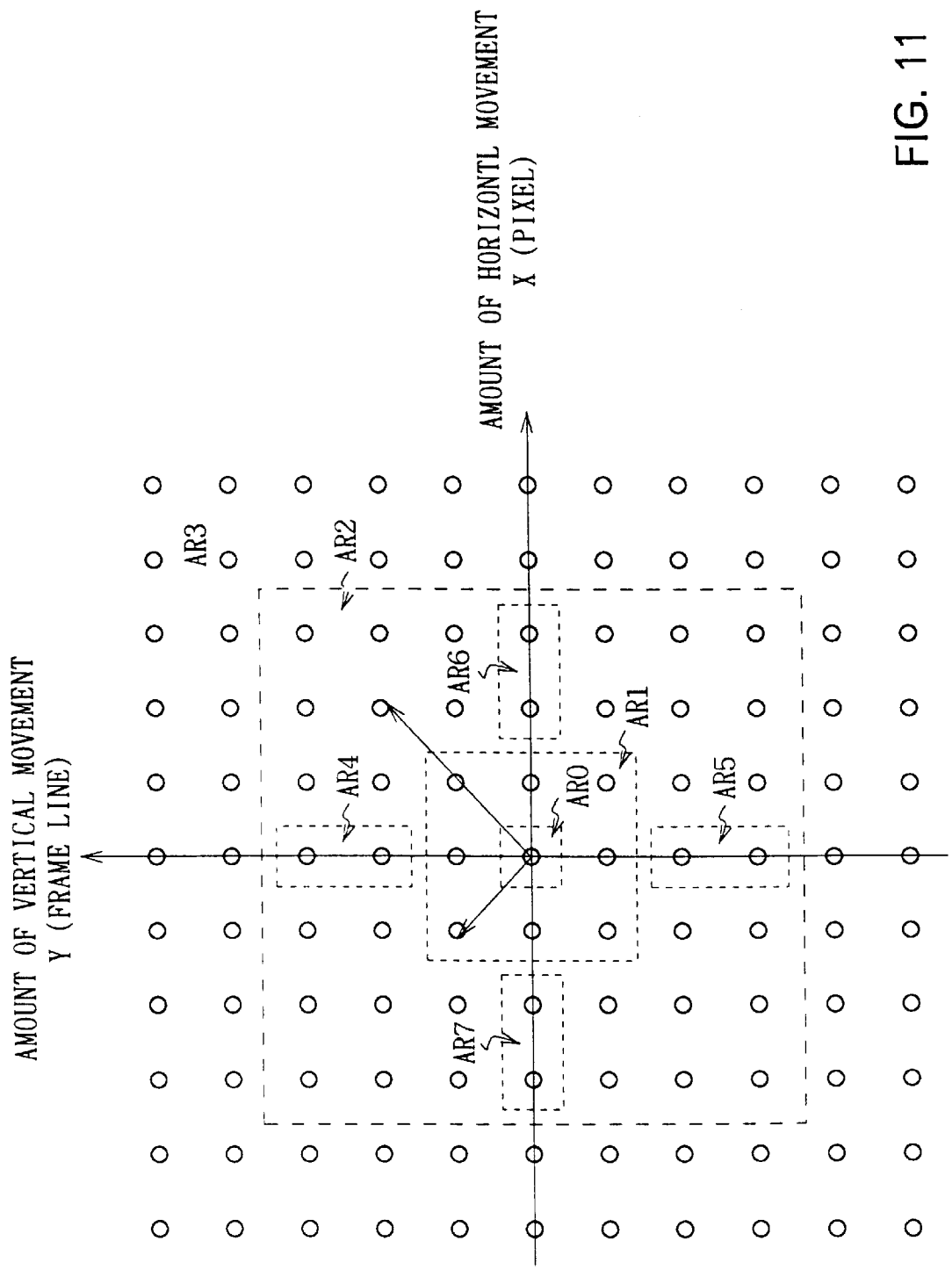
FIG. 11 is a schematic diagram showing a pattern classification example to form a movement class in the first embodiment.
Figure 12:
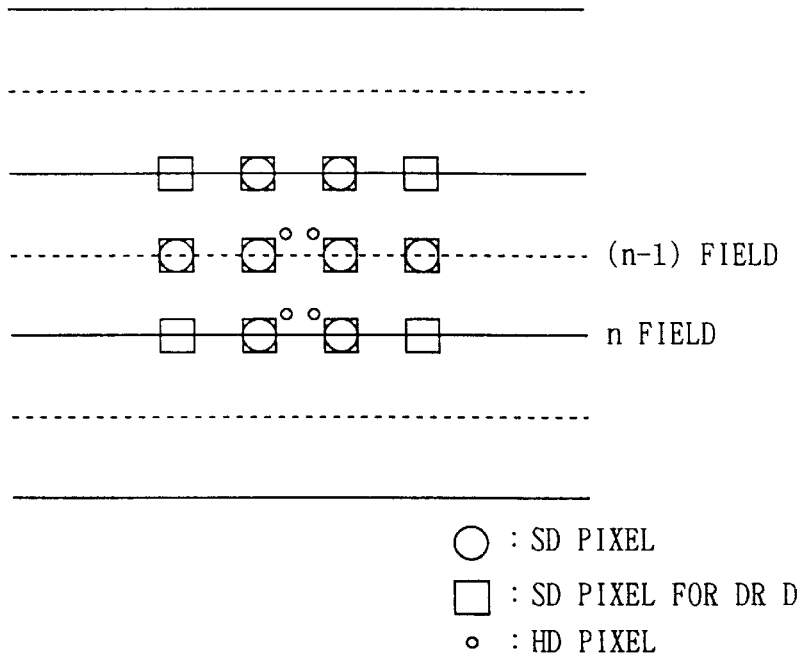
FIGS. 12 to 19 are schematic diagrams showing classification tap patterns selected by the classified pixel selecting circuit of the first embodiment.
Figure 13:
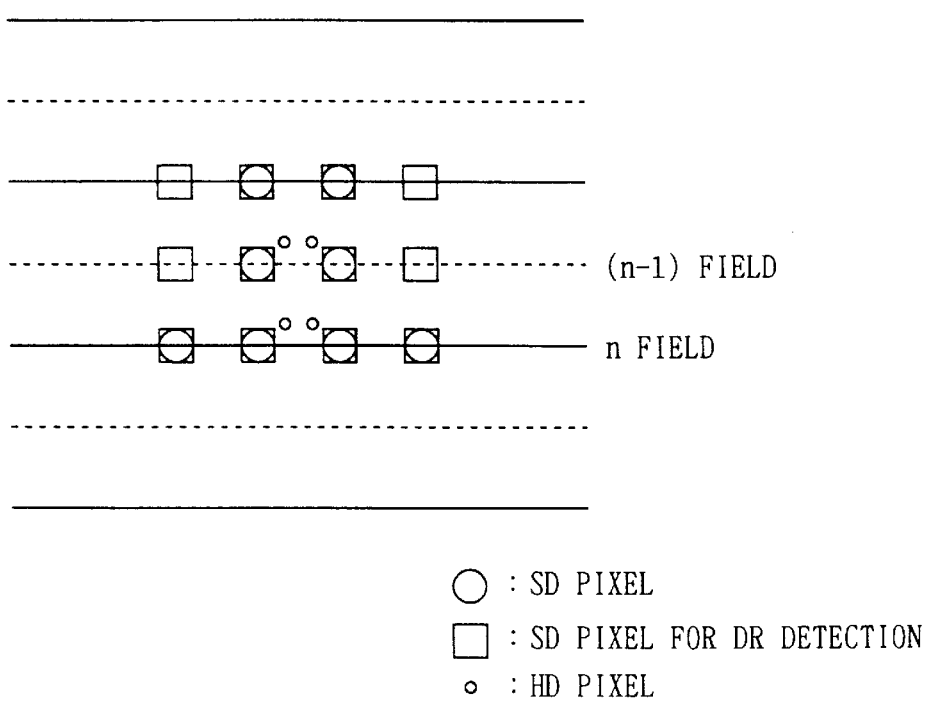

The pattern setting circuit 54A sets a pixel pattern corresponding to the area AR0 enclosed by a dotted line at the center of FIG. 11, that is, corresponding to the case in which a motion vector is completely zero. In this case, because an input signal is under a completely stationary state, classification reflecting features of input signals is realized by using a spatiotemporal classification tap pattern nearby a noticed pixel at the time of classification according to a level distribution pattern. Therefore, the pattern setting circuit 54A sets the classification class tap pattern shown in FIG. 12. Moreover, in FIGS. 12 to 19, an HD pixel shown by a small circle represents a noticed HD pixel to be interpolated.

The pattern setting circuit 54B sets a so-called pixel pattern corresponding to a case of being semi-stationary. That is, the circuit 54B sets a pixel pattern corresponding to a case in which a motion vector is present in the area AR1 between the dotted line at the center of FIG. 11 and the second dotted line from the center. This is a case in which an image slightly moves. Therefore, by setting an intermediate pixel pattern between a stationary portion and a dynamic image portion, classification reflecting features of input signals is realized. Therefore, the pattern setting circuit 54B sets the classification tap pattern shown in FIG. 13. Compared with the case of being completely stationary in FIG. 12, an in-space pixel is more stressed than a spatiotemporal pixel by increasing the number of pixels in the same field.

Figure 14:
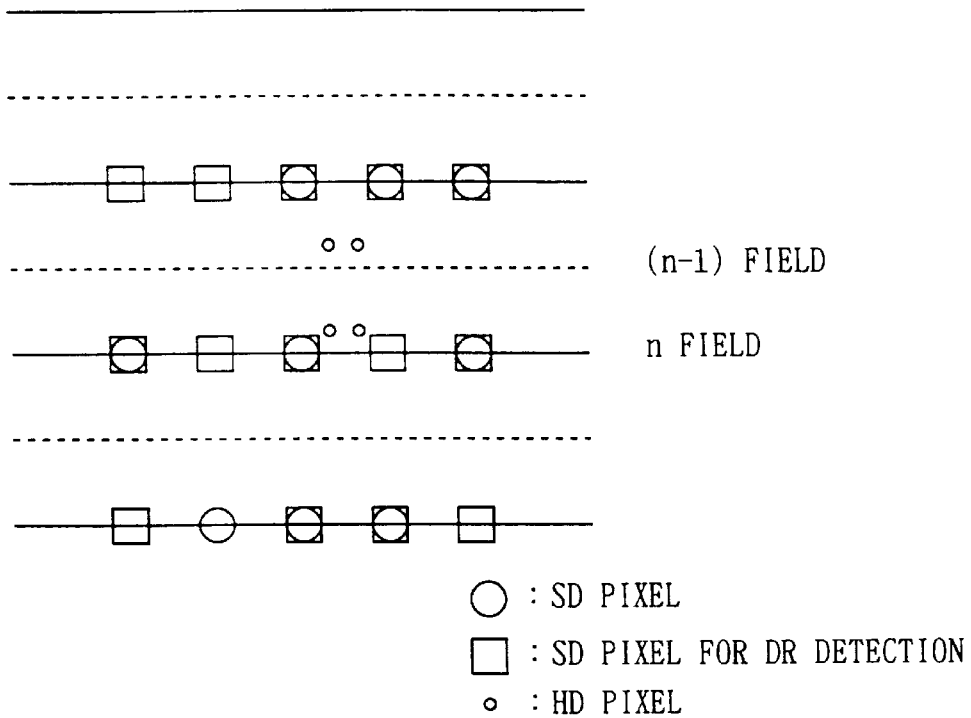

The pattern setting circuit 54C sets a pixel pattern corresponding to a middle amount of movement. That is, the circuit 54C sets a pixel pattern corresponding to a case where a motion vector is present in the area AR2 excluding the areas AR0 and AR1 and the areas AR4 to AR7 in the characteristic movement direction inside the outermost dotted line in FIG. 11. In fact, the pattern setting circuit 54C reflects a waveform change in a slightly wide area on a class by setting a pixel in a wider area in the same field as shown in FIG. 14.

Figure 15:
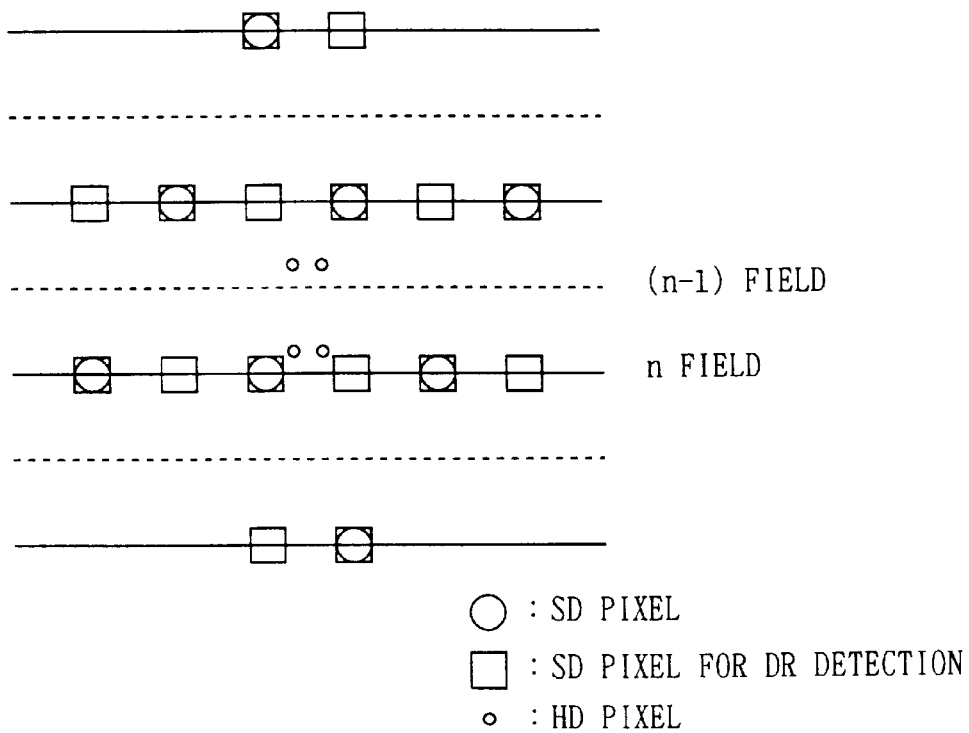

The pattern setting circuit 54D sets a pixel pattern corresponding to a large amount of movement. That is, the circuit 54D sets a pixel pattern corresponding to a case where a motion vector is present in the area AR3 outside of the outermost dotted line of FIG. 11. Therefore, the pattern setting circuit 54D reflects a waveform change in an area wider than the pattern setting circuit 54C on a class by setting a pixel in an area wider than the case of FIG. 14 in the same field as shown in FIG. 15.

Figure 16:
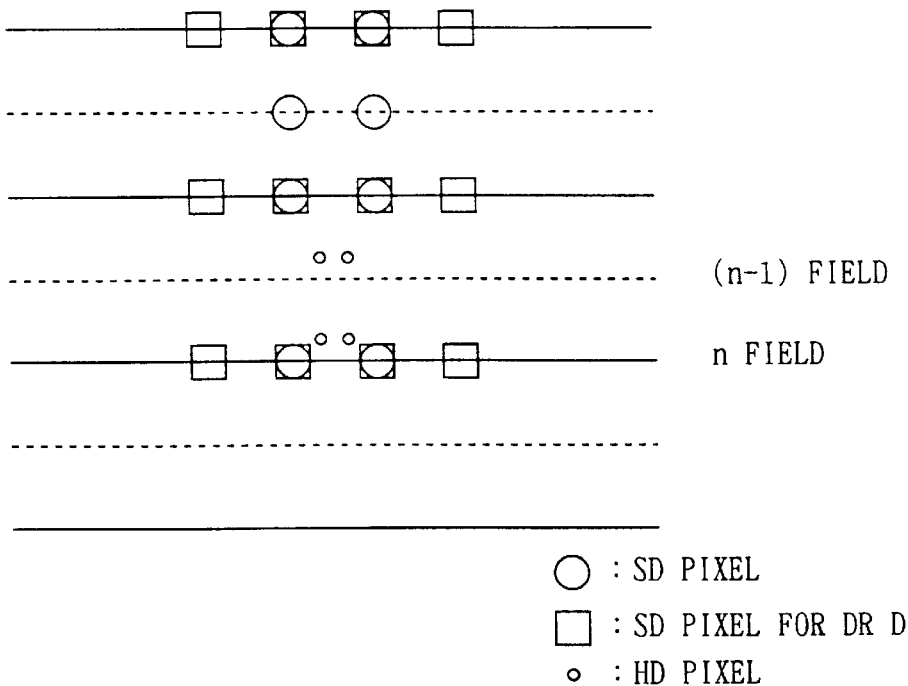

The pattern setting circuit 54E sets a pixel pattern corresponding to a case where a motion vector is present in the area AR4 enclosed by the upward dotted line in FIG. 11, that is, corresponding to the movement of an upper tilt. Therefore, the pattern setting circuit 54E makes it possible to perform classification corresponding to upward movement in the ADRC classifying circuit 56 by setting a pixel pattern extending upward (that is, in the movement direction) as shown in FIG. 16.

Figure 17:
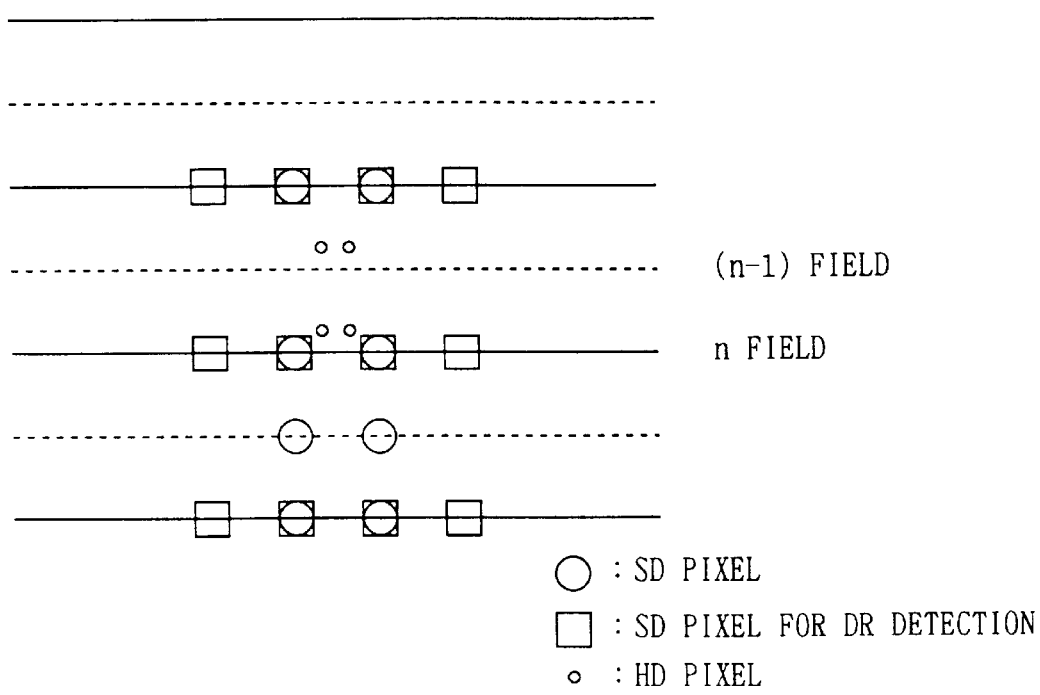

The pattern setting circuit 54F sets a pixel pattern corresponding to a case where there is a movement in the direction of the area AR5 enclosed by the downward dotted line in FIG. 11, that is, corresponding to the movement of a lower tilt. Therefore, the pattern setting circuit 54F makes it possible to perform classification corresponding to downward movement in the ADRC classifying circuit 56 by setting a pixel pattern extending downward as shown in FIG. 17.

Figure 18:
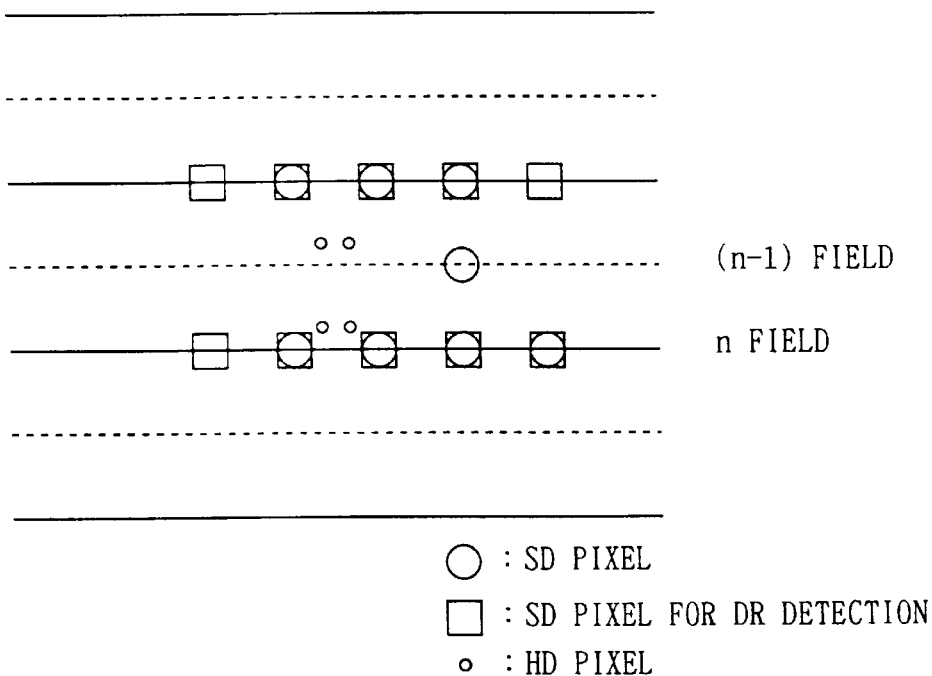

The pattern setting circuit 54G sets a pixel pattern corresponding to a case where a motion vector is present in the area AR6 enclosed by the rightward dotted line in FIG. 11, that is, corresponding to the movement of right panning. Therefore, the pattern setting circuit 54G makes it possible to reflect the characteristic of an image moving rightward on classification by setting a pixel pattern extending rightward as shown in FIG. 18. In this case, however, because a vertical movement is considered to be small, the number of pixels in the vertical direction is decreased.

Figure 19:
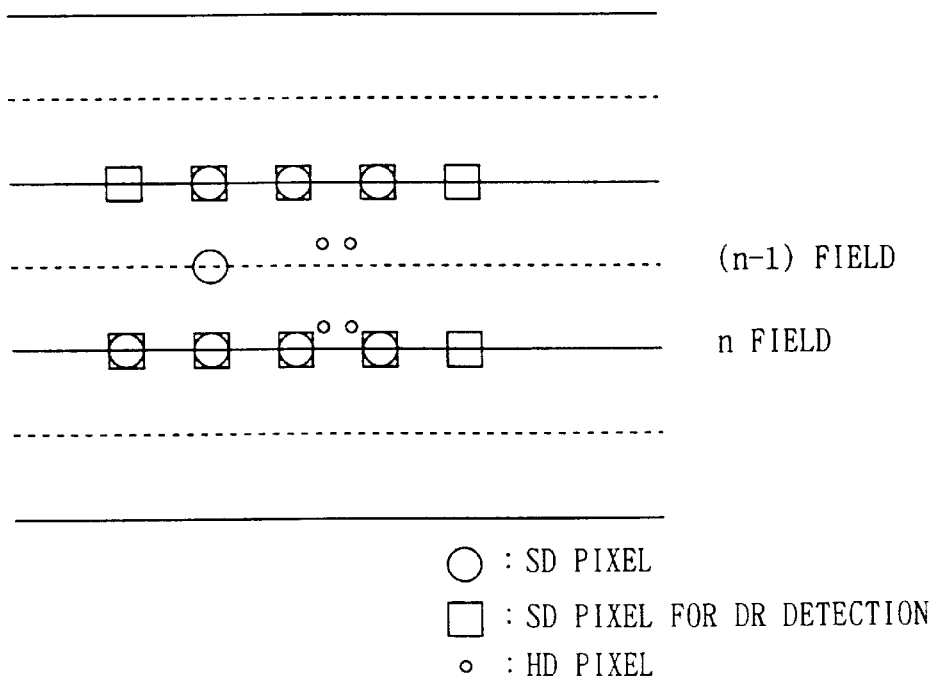

The pattern setting circuit 54H sets a pixel pattern corresponding to a case where there is a movement in the direction of the area AR7 enclosed by the leftward dotted line in FIG. 11, that is, corresponding to the movement of left panning. Therefore, the pattern setting circuit 54H makes it possible to reflect the characteristic of an image moving leftward on classification by setting a pixel pattern extending leftward as shown in FIG. 19.

Moreover, each of the pattern setting circuits 54A to 54H is constituted so that a pixel area for detecting a local dynamic range (DR) becomes wider than a set pixel pattern by considering the classification by the ADRC classifying circuit 56 at the rear stage as shown in FIGS. 12 to 19. Therefore, the tap data supplied from the class tap selecting circuit 55 comes to tap data for obtaining classification tap data and a dynamic range DR. As a result, it is possible to further reflect a waveform change around a noticed pixel on a class in the classification by the ADRC classifying circuit 56.

Note that, the ADRC classifying circuit 56 may switch the number of quantization bit in accordance witwith the motion class code CLASS0.

(1-3) Operations of First Embodiment

In the case of the above structure, classifying circuits 31 and 41 first detect the motion vector of the input SD image data D1 by the first classification unit 50 and generates the motion class code CLASS0 in accordance with the detection result in order to classify noticed pixels. Moreover, the classifying circuits 31 and 41 previously set a classification tap pattern corresponding to each of motion classes from the input SD image data D1 by the classified pixel selecting means 53.

Then, the classifying circuits 31 and 41 select a classification tap pattern corresponding to a detected motion class and transmits the selected tap pattern to the ADRC classifying circuit 56 serving as the second classification means for expressing a level distribution pattern with a small amount of information. Thus, the ADRC classifying circuit 56 can generate the ADRC class code CLASS1 according to the level distribution pattern of the SD image data D1 by using a classification tap pattern corresponding to the movement of the SD image data D1. Therefore, it is possible to obtain the ADRC class code CLASS1 adequately reflecting features of images.

The classifying circuits 31 and 41 transmit the prediction coefficient ROM 32 at the rear stage (FIG. 8) or the coefficient selecting circuit 24 (FIG. 9) as the class code D32. Thereby, because the coefficient selecting circuit 24 can obtain a prediction coefficient for each class by collecting prediction coefficients with a similar characteristic. Therefore, it is possible to improve the accuracy of a prediction coefficient. Moreover, because the up-converter 30 can perform predictive operation by using the accurate prediction coefficient thus obtained, it is possible to obtain an HD interpolation pixel closer to a true value.

(1-4) Advantages of First Embodiment

The above structure makes it possible to more accurately classify input SD images because of generating a motion class according to the movement of pixels around a noticed pixel in addition to a class according to the level distribution pattern of pixels around the noticed pixel and using the combination of these classes as the final classification result. Moreover, as the result of adaptively selecting a classification tap pattern used for the classification based on a level distribution pattern correspondingly to a motion class, it is possible to obtain a classification result based on the level distribution pattern well reflecting features of input images.

As a result, it is possible to obtain a more accurate prediction coefficient for each class by calculating a prediction coefficient in accordance with the class. Moreover, by obtaining an interpolation pixel value through predictive operation using the prediction coefficient, it is possible to improve the prediction performance of the HD interpolation pixel data D33 and thereby, realize the up-converter 30 capable of converting the SD image data D1 to higher-resolution HD image data D34.

(2) Second Embodiment

The above first embodiment detects eight types of movement from input image signals to generate the motion class code CLASS0 and selects a classification tap pattern corresponding to the motion class code CLASS0 from eight types of classification tap patterns previously set correspondingly to these eight types of movement. However, the second embodiment generates a motion class code by detecting only presence or absence of movement and selects a classification tap pattern in accordance with presence or absence of movement. Actually, an in-field pixel is selected as a classification tap pattern when the vicinity of a noticed pixel is a dynamic image part and an in-frame pixel is selected when it is a stationary part.

That is, when there is movement in an image to be classified, an in-field pixel is selected so that classification corresponding to a signal change in a space completely excluding a temporal characteristic can be performed. However, when there is no movement in an image signal to be classified, a pixel having a spread in the temporal direction is selected so that a signal change nearby a noticed pixel can be reflected on classification as mush as possible in a spatiotemporal structure. Therefore, for example, in-frame pixels or pixels for several fields are selected.

Figure 20:
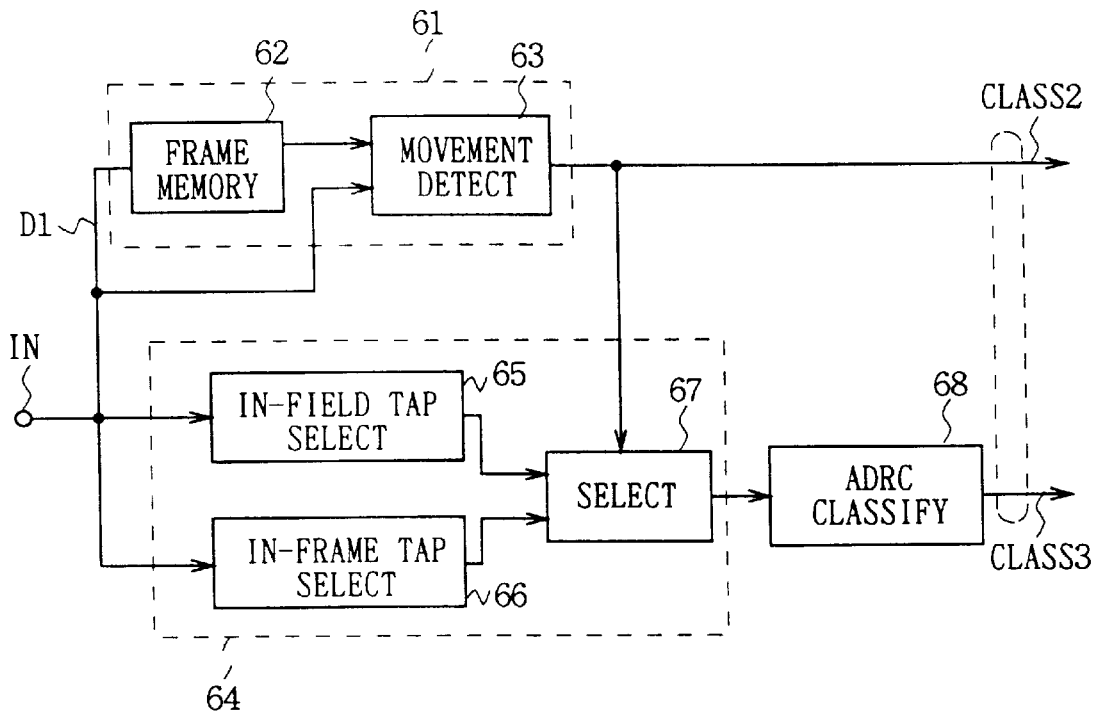
FIG. 20 is a block diagram showing the structure of the classifying circuit according to the second embodiment.

Practically, the classifying circuit of the second embodiment is constitutes as shown in FIG. 20. That is, a classifying circuit 60 inputs the SD image data D1 to a frame memory 62 and a movement detecting circuit 63 which constitute a classifying unit 61 and moreover inputs the data D1 to an infield tap selecting circuit 65 and an in-frame tap selecting circuit 66 of classified pixel selecting unit 64.

The movement detecting circuit 63 detects an amount of movement in accordance with the SD image data D1 of the present frame directly input and the SD image data D1 of the past frame input through the frame memory 62. In this case, the amount of movement detecting circuit 63 calculates the inter-frame difference value between image data of the present frame and that of the past frame for each of blocks centering around a noticed pixel and decides that the block is a dynamic image part when the difference value is less than a predetermined threshold value and that the block is a stationary part when it is equal to or more than the predetermined threshold value. The movement detecting circuit 63 outputs the decision result as a one-bit motion class code CLASS2.

Figures 21A, 21B:
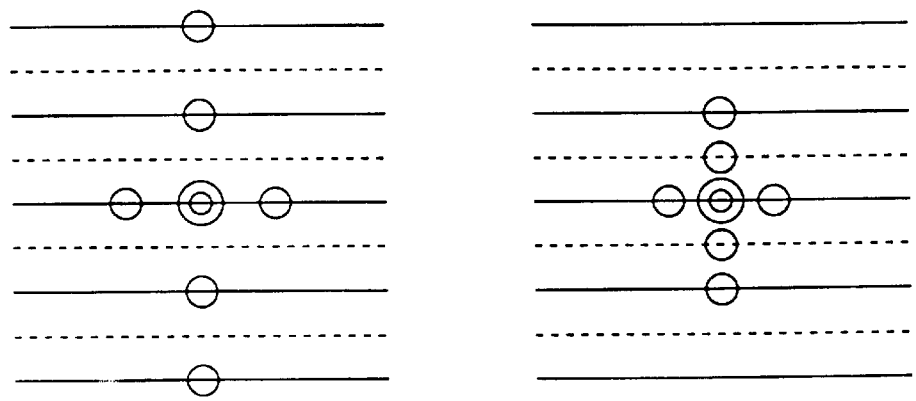
FIGS. 21A and 21B are schematic diagrams showing classification tap patterns selected by the classifying circuit of the second embodiment.

The in-field tap selecting circuit 65, as shown in FIG. 21A, sets in-field taps centering around a noticed pixel (shown by symbol ⊙ in FIGS.) and transmits the data for the in-field taps to a selecting circuit 67. The in-frame tap selecting circuit 66, as shown in FIG. 21B, sets in-frame taps centering around a noticed pixel and transmits the data for the in-frame taps to the selecting circuit 67. The selecting circuit 67 alternatively outputs input in-field tap data or in-frame tap data in accordance with the motion class code CLASS2. That is, the circuit 67 outputs the in-field tap data when the motion class code CLASS2 represents a dynamic image part and the in-frame tap data when the code represents a stationary part.

The classification tap data output from the selecting circuit 67 is supplied to an ADRC classifying circuit 68. The ADRC classifying circuit 68 adaptively re-quantizes the classification tap data in accordance with its dynamic range and generates an ADRC class code CLASS3 having less number of classes. In the case of the second embodiment, data for seven pixels is transmitted to the ADRC classifying circuit 68 as classification tap data. Therefore, when applying one-bit ADRC processing to the classification tap data, the data is classified into 128 types of classes. Then, classification results of the total of 8 bits (256 types) including 1 bit as the motion class code CLASS2 and 7 bits as the ADRC class code CLASS3 are finally output from the classifying circuit 60.

Practically, the classifying circuit 60 is used as the classifying circuit 31 of the up-converter 30 (FIG. 8) and the classifying circuit 41 of the learning circuit 40 (FIG. 9) above described in the first embodiment and the generated motion class code CLASS2 and ADRC class code CLASS3 are transmitted to the predictive coefficient ROM 32 and the coefficient selecting circuit 24.

The above structure makes it possible to more accurately classify input SD images because of generating not only a class according to the level distribution pattern of pixels around a noticed pixel but also a motion class corresponding to presence or absence of the movement of pixels around the noticed pixel and using the combination of these classes as the final classification result. Moreover, it is possible to obtain a classification result according to a level distribution pattern well reflecting features of input SD images by adaptively selecting a class tap pattern used for the classification according to the level distribution pattern correspondingly to presence or absence of movement.

As a result, it is possible to obtain a more accurate predictive coefficient for each class by calculating a predictive coefficient in accordance with the class. Moreover, by obtaining an interpolation pixel value through predictive operation using the predictive coefficient, it is possible to improve the prediction performance of the HD interpolation pixel data and thereby, realize an up-converter capable of converting the SD image data D1 to higher-resolution HD image data.

Moreover, as the result of generating a motion class only in accordance with presence or absence of movement, it is possible to simply the structure of the first classifying unit 61 and that of the classified pixel selecting unit 64 compared with the first embodiment.

Note that, in the ADRC classifying circuit 68 serving as the second classifying means, a pixel area for detecting a dynamic range may become wider than a set pixel pattern similarly with the case of the first embodiment. Moreover, a pixel area for detecting a dynamic range may be determined according to the motion class code CLASS2.

Furthermore, the ADRC classifying circuit 68 its number of quantization bits may be switched according to the motion class code CLASS2.

(3) Third Embodiment

The third embodiment improves the classification performance by performing multiple-stage classification in which the movement of images is considered. That is, the third embodiment makes it possible to obtain a classification result more accurately expressing features of input images by roughly classifying the input images at the initial stage and thereafter, adaptively selecting a classification tap corresponding to the initial-state result and performing fine classification different from that of the initial stage at the next stage.

Moreover, it can be said that the above-described first and second embodiments also perform multiple-stage classification by considering the first classifying units 50 and 61 as the first-stage classification and considering the ADRC processing of a classification tap adaptively selected correspondingly to the above classification result as the next-stage classification. However, the third embodiment is different from the first and second embodiments in the way of generating a motion class and the way of setting a classification tap.

That is, in the case of the third embodiment, a first classifying means comprises a predicted value calculating circuit having a plurality of coefficients previously selected by considering the movement of a plurality of types of images to calculate a plurality of predicted values for a noticed pixel by using these predictive coefficients and the data for pixels around a noticed pixel, a difference value calculating circuit for calculating difference values between a plurality of predicted values calculated by the predicted value calculating circuit and the value of the noticed pixel, and a means for deciding the movement around the noticed pixel and outputting a first class code for expressing the movement.

Figure 22:
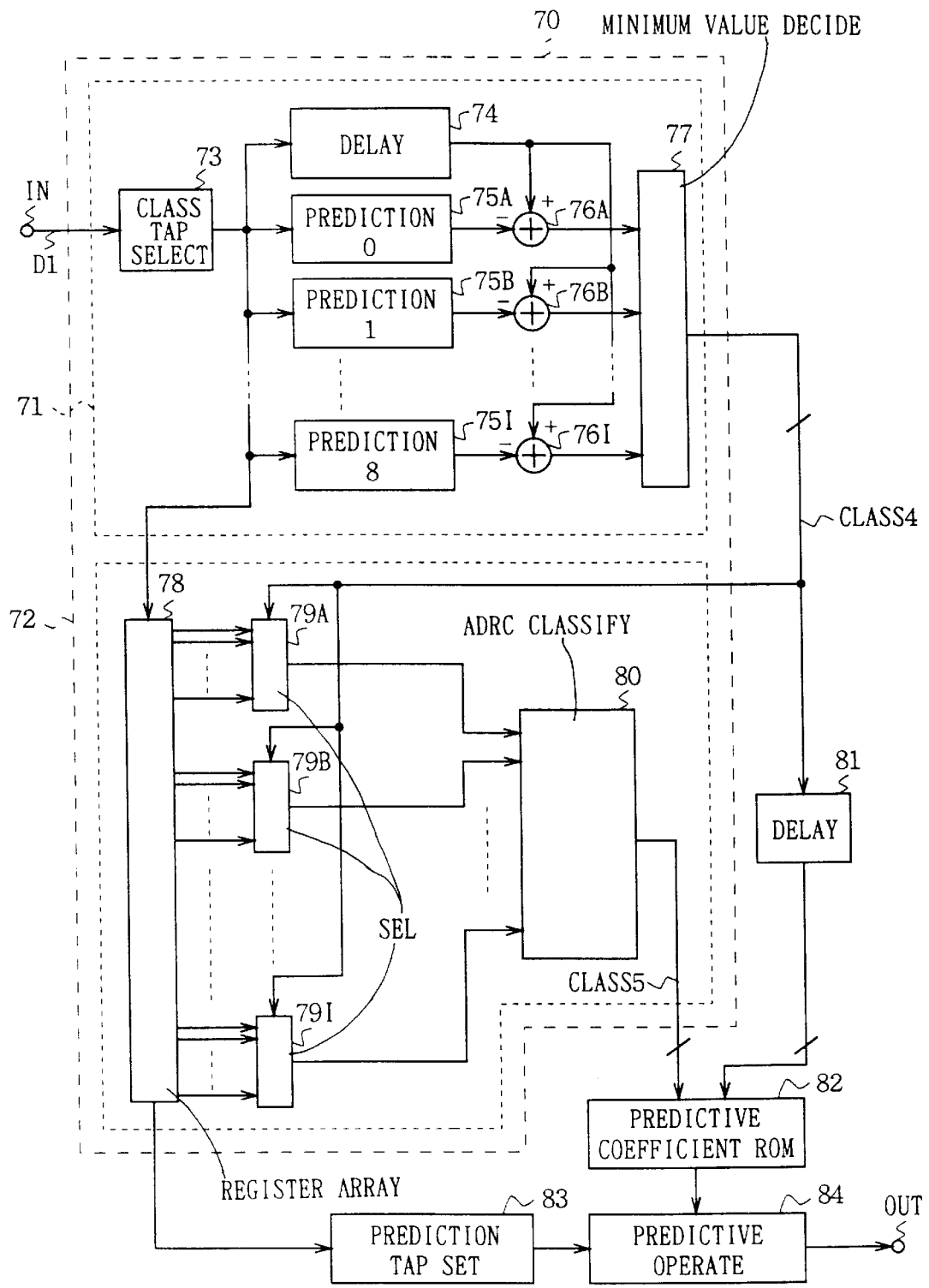
FIG. 22 is a block diagram showing the structure of the classifying circuit according to the third embodiment.

FIG. 22 shows a specific structure of the classifying circuit of the third embodiment, which is an example of performing classification in two stages. A classifying circuit 70 corresponding to the classifying circuit 31 in FIG. 8 is constituted to perform rough classification according to the movement of an image in a first-stage classifying circuit 71 serving as a first classifying means and selects a classification tap corresponding to the classification result in a next-stage classifying circuit 72 to perform fine classification. In this case, the next-stage classifying circuit 72 simultaneously functions as the classified pixel selecting circuit 53 and the second classifying circuit (that is, the ADRC classifying circuit) 56 of the first embodiment.

The initial-stage classifying circuit 71 decides a direction from which a noticed pixel comes when input images move and roughly classifies the input images in accordance with the decision result. Therefore, the initial-stage classifying circuit 71 calculates the differences between the value of the noticed pixel and the linear predicted value for the noticed pixel calculated (9 differences in the case of this embodiment) by using a plurality of pixels around the noticed pixel. Moreover, the circuit 71 roughly classifies the input images into plural classes by synthetically comparing and judging the calculated difference results.

In this case, coefficients used for linear prediction are prepared through learning with an image obtained by artificially moving an input image at an optional size in a certain direction. A description of the learning method of coefficients is omitted herein because it is similar to the learning method of the predictive coefficients in the predictive coefficient ROM. For example, nine types of coefficient sets are obtained by learning nine types of directions shown in FIG. 24 as indexes for rough classification. These coefficient sets are used as coefficients for linear prediction. In this case, in FIG. 24, the central area "0" shows a hardly-moving stationary or semi-stationary area and the upper area "1" shows a case in which there is an upward movement.

Figure 23:
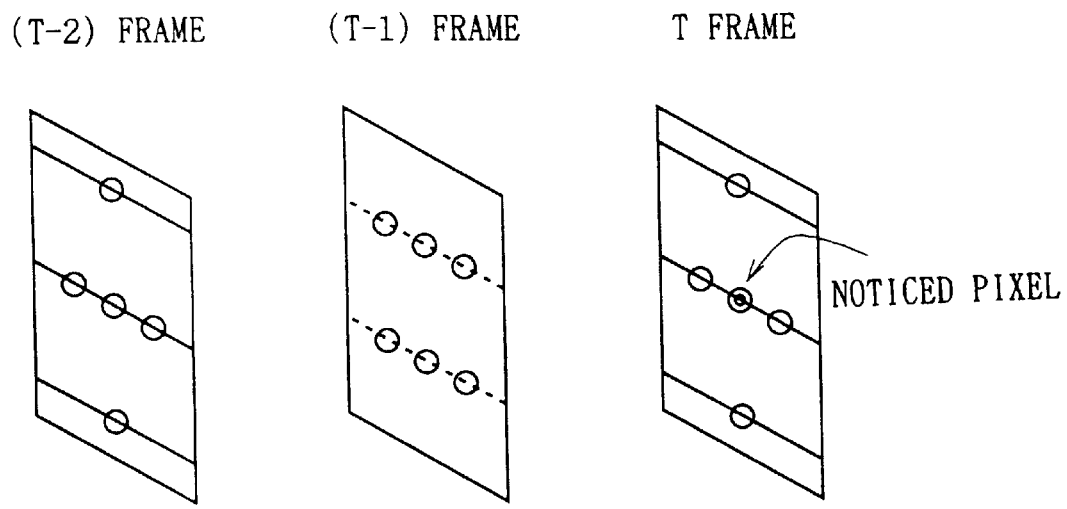
FIG. 23 is a schematic diagram showing a classification tap used to form a movement class in the third embodiment.

Practically, the initial-stage classifying circuit 71 inputs the input SD image data D1 which is input through the input terminal IN to a class tap setting circuit 73 for setting a classification tap for the rough classification at the initial stage. As shown in FIG. 23, the class tap setting circuit 73 sets pixels adjacent to a noticed pixel in the space-time continuum as classification taps out of a frame including the noticed pixel, a frame one frame before the first frame, and a frame two frames before the first frame (for this embodiment, 16 pixels including the noticed pixel) and transmits the data for the pixels adjacent to the space-time continuum excluding the noticed pixel to predicting circuits 75A to 75I.

Each of the predictive circuits 75A to 75I has a predictive coefficient suitable for its movement and predicts a noticed pixel value through the linear prediction between the predictive coefficient sets and the class taps. In difference circuits 76A to 76I, the difference between the value of a noticed pixel input through a delay circuit 74 and the predicted value obtained by each of the predicting circuits 75A to 75I are calculated and each difference value is supplied to a minimum value deciding circuit 77.

In this case, when an input image moves from right to left, a prediction result calculated using the predictive coefficient obtained through the learning assuming the movement of the image must take a value closest to a noticed pixel compared with other cases. Therefore, the minimum value deciding circuit 77 classifies moving directions by detecting a difference result with the minimum absolute value out of nine types of difference results. Thus, the rough classification can be performed at the initial stage. Therefore, the initial-stage classifying circuit 71 outputs nine types (four bits) of motion class codes CLASS4.

After the initial-stage classifying circuit 71 detects moving directions, the next-stage classifying circuit 72 performs finer classification by extracting features from the images. In this case, the next-stage classifying circuit 72 does not perform classification by using a uniform class tap structure but it performs classification by selecting a classification tap pattern specified in a moving direction in accordance with a motion class classified by the initial-stage classifying circuit 71. Thereby, the next-stage classifying circuit 72 can perform the classification further adapted to the feature of an input image.

Figure 25:
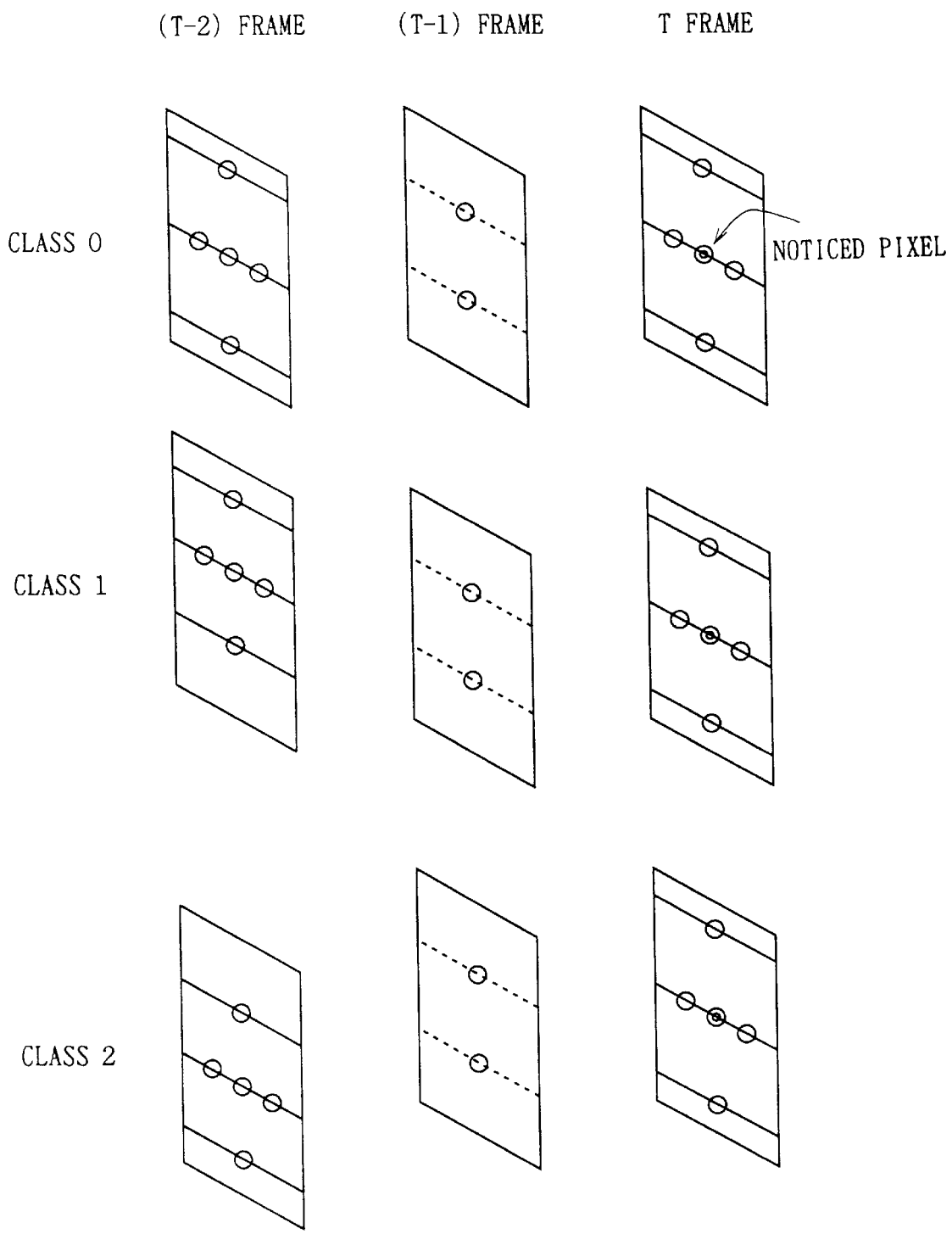
FIGS. 25 to 27 are schematic diagrams showing classification tap patterns selected by the classified pixel selecting circuit of the third embodiment.
Figure 26:
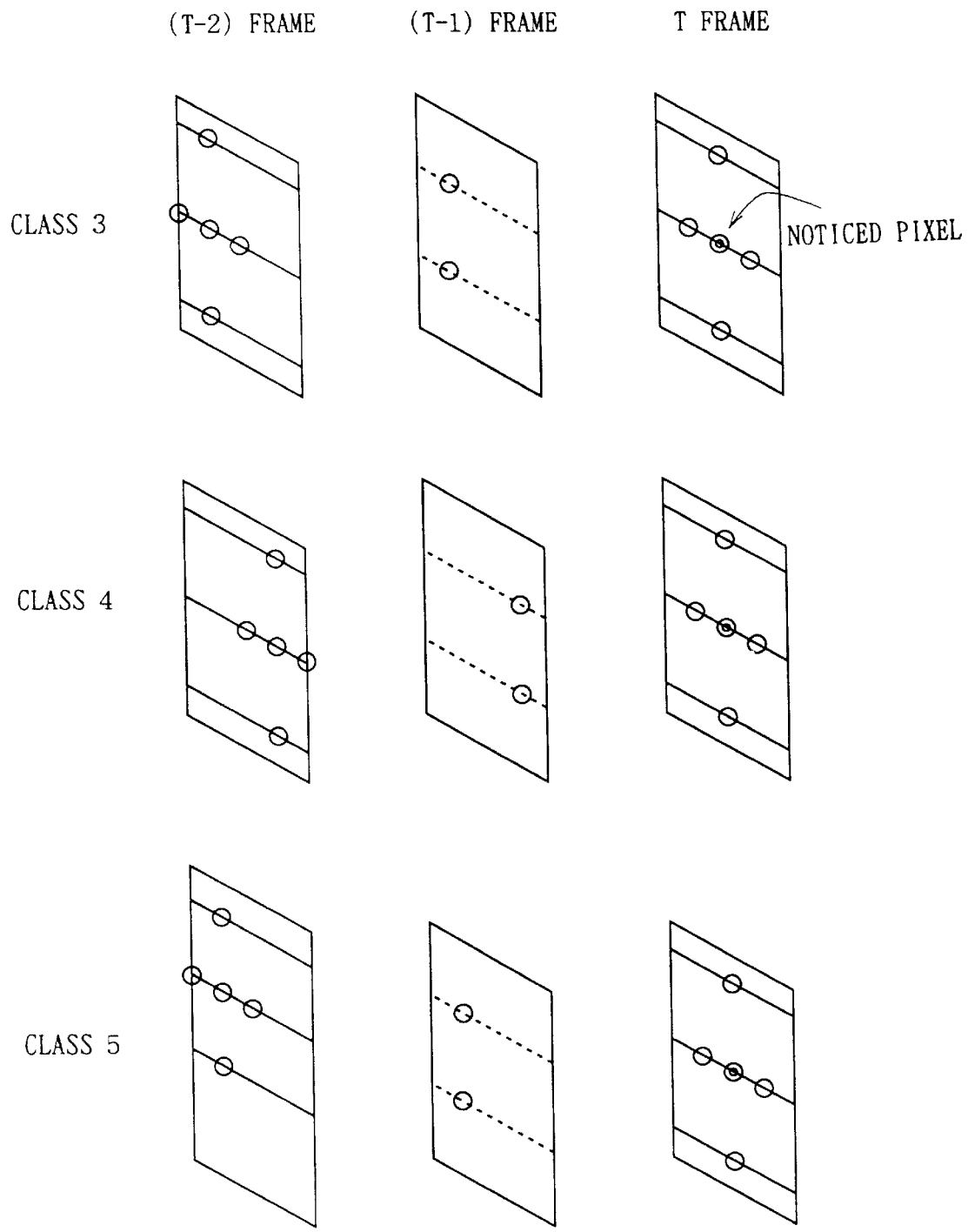
Figure 27:
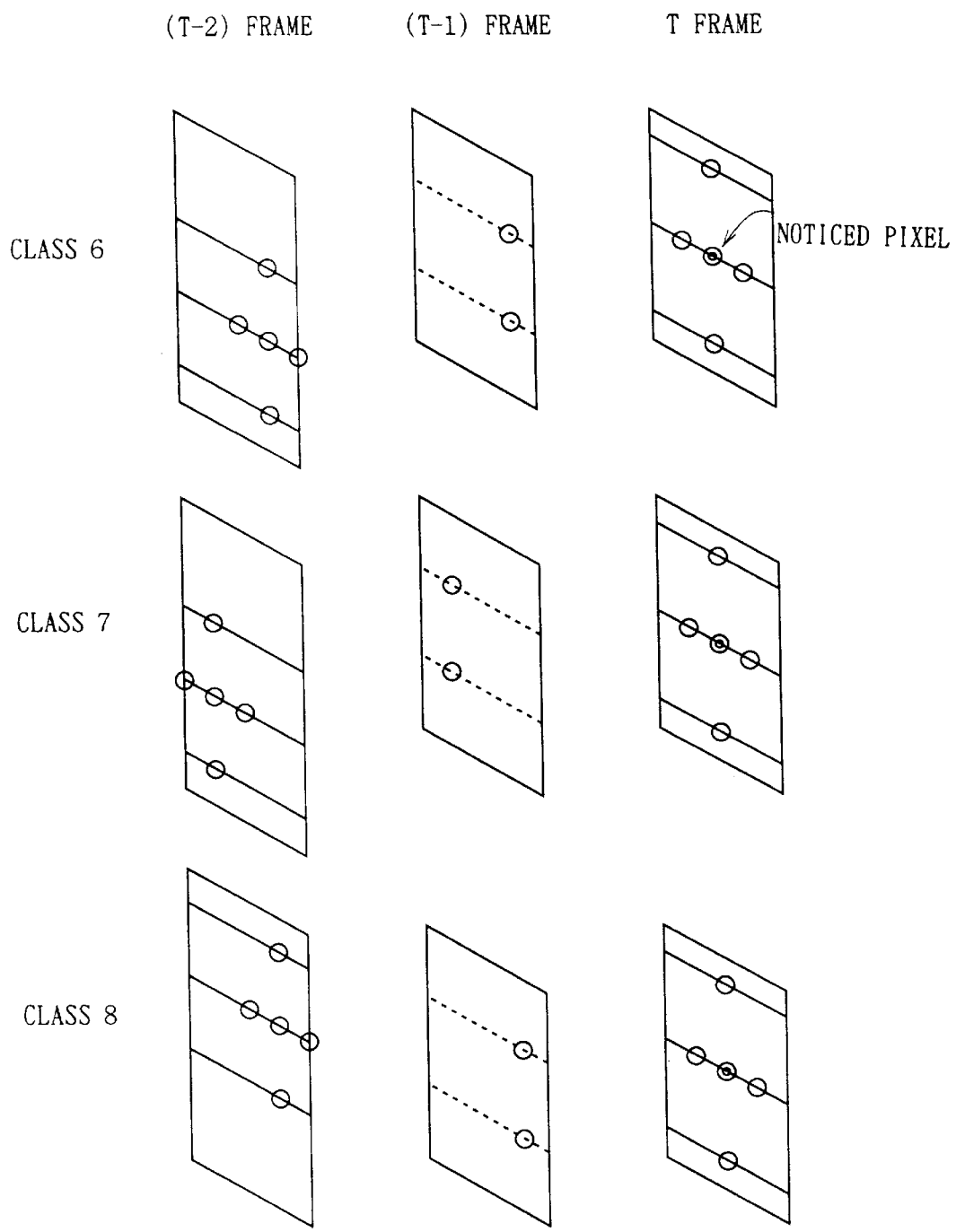

Therefore, the next-stage classifying circuit 72 has a circuit structure capable of changing classification tap patterns in accordance with a classification result at the initial stage. The next-stage classifying circuit 72 supplies outputs of the class tap setting circuit 73 to plural selectors 79A to 79I through a register array 78. As shown in FIGS. 25 to 27, each of the selectors 79A to 79I sets nine types of classification taps corresponding to the motion class code CLASS4. Then, any one of the selectors 79A to 79H or 79I is alternatively selected correspondingly to the motion class code CLASS4 output from the minimum value deciding circuit 77 of the initial-stage classifying circuit 71 and the class tap of a selected selector of the selectors 79A to 79H or 79I is transmitted to an ADRC classifying circuit 80 serving as a second classifying means. As a result, the optimum classification tap corresponding to a classification result at the initial stage is supplied to the ADRC classifying circuit 80.

Figure 24:
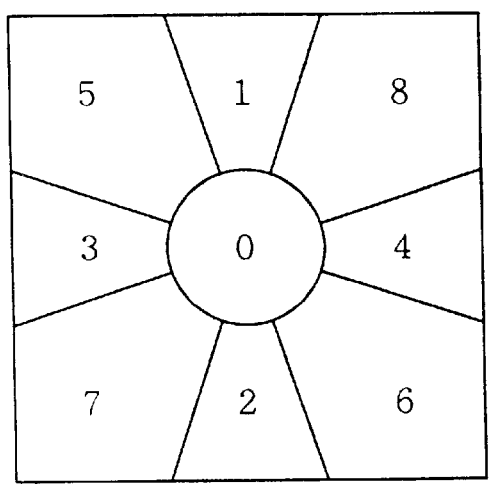
FIG. 24 is a schematic diagram showing a pattern classification example to form a movement class in the third embodiment.

For example, when it is decided by the initial-stage classifying circuit 71 that the vicinity of a noticed pixel moves from left to right (that is, when there is a movement in the direction of the area "4" in FIG. 24), it is advantageous that a classification tap extends in the temporally horizontal direction in view of the space-time continuum and therefore, the selectors 79A to 79I are controlled so that 12 pixels meeting the above are selected (class 4 in FIG. 26). Similarly in other directions, a classification tap corresponding to the motion class code CLASS4 is selected.

The ADRC circuit 80 generates an ADRC class code CLASS5 by compressing the number of bits of a classification tap in its level direction selected similarly with the cases of the first and second embodiments with an adaptive dynamic range. As shown in FIGS. 25 to 27, this embodiment uses classification taps of 12 pixels. Therefore, by adaptively re-quantizing each pixel into one bit by the ADRC classifying circuit 80, 4,096 classified ADRC classes are generated.

Thereby, a classification tap of the next-stage classifying circuit 72 is selected in accordance with a classification result by the initial-stage classifying circuit 71 and patterns of 4,096 classes according to one-bit ADRC are classified by using the selected classification tap. As a result, classification of 36,864 classes can be performed for a noticed pixel as the total from the initial stage.

The motion class codes CLASS4 and the ADRC class code CLASS5 thus obtained are output as read addresses of the predictive coefficient ROM 82. In this connection, a delay circuit 81 delays the motion class code CLASS4 by the processing time by the next-stage classifying circuit 72. In this case, in the predictive coefficient ROM 82, a predictive coefficient can be generated by using the classifying circuit 70 of the third embodiment instead of the classifying circuit 41 in the learning circuit of FIG. 9 and also applying the algorithm of the classifying circuit 70 in the third embodiment to the processing in the classifying circuit 31 of FIG. 10. That is, it is possible to obtain a predictive coefficient corresponding to the mode1, mode2, mode3, and mode4 for each class by combining the motion class code CLASS4 with the ADRC class code CLASS5 through the learning using a normal equation corresponding to the mode1, mode2, mode3, and mode4 and store the predictive coefficient in the address of the class.

Figure 28:
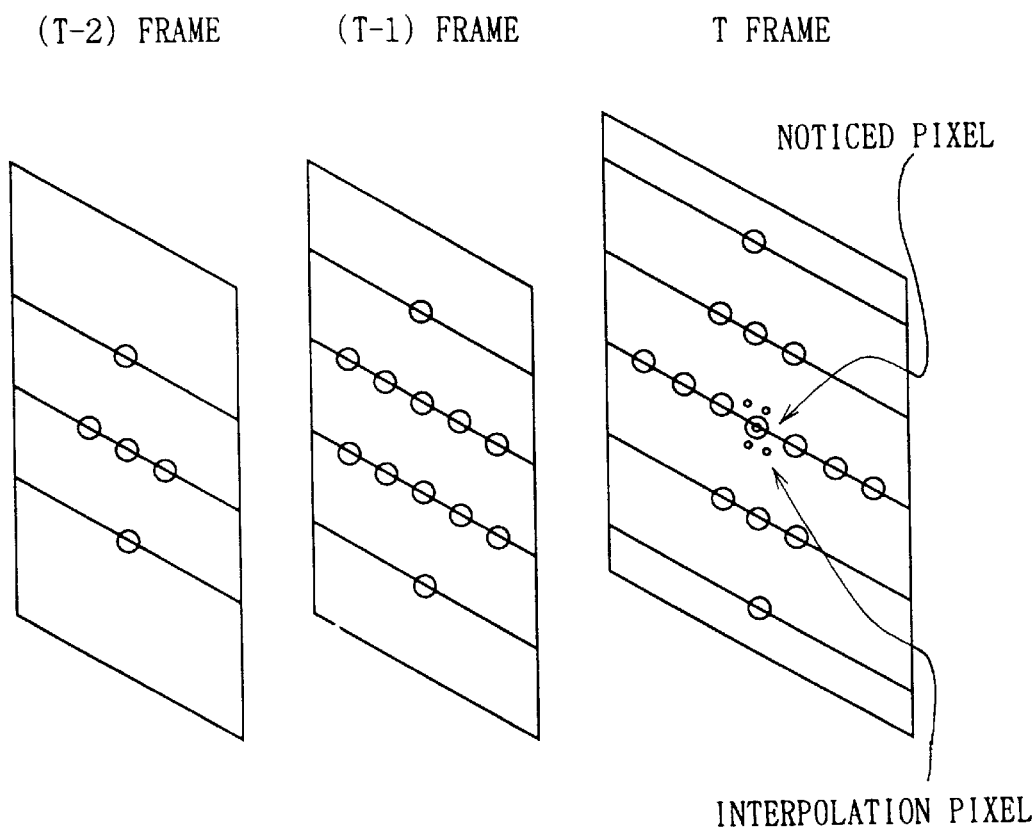
FIG. 28 is a schematic diagram showing prediction taps in the third embodiment.

A predictive coefficient for the mode1, mode2, mode3, and mode4 read out from the predictive coefficient ROM 82 correspondingly to the motion class code CLASS4 and the ADRC class code CLASS5 are supplied to a predictive operating circuit 84 together with a prediction tap set by a prediction tap setting circuit 83. The predictive operating circuit 84 obtains HD interpolation pixel data by linearly and primarily combining the prediction tap with the predictive coefficient similarly to the case of the above-described predictive operating circuit 12 (FIG. 8). Then the circuit 84 converts the HD interpolation pixel data to time-sequential data and outputs this. FIG. 28 shows an example of a prediction tap set by the prediction tap setting circuit 83.

The above structure effectively improves the classification accuracy because of performing rough classification according to the movement of an image by the initial-stage classifying circuit 71 and thereafter performing fine classification by the next-stage classifying circuit 72.

Moreover, it is possible to easily generate the motion code CLASS4 because of applying a plurality of times of linear prediction to a noticed pixel by using a plurality of predictive coefficients previously obtained through learning for each moving direction when performing classification according to the movement of an input image at the initial stage and obtaining the motion class code CLASS4 by using a direction in which a predicted value closest to a true value is obtained among predicted values as a moving direction.

Note that, in the ADRC classifying circuit 80 serving as a next-stage classifying means, similarly to the case of the aforementioned embodiments, a pixel area to be detected the dynamic range may be taken wider than a set pixel pattern, further, the pixel area may be determined corresponding to the motion class code CLASS4.

Moreover, the ADRC classifying circuit 80 may switch the number of quantization bits corresponding to the motion class code CLASS2.

(4) Fourth Embodiment

In the case of this embodiment, a first classifying means comprises: a first blocking means for forming the present frame of an input image data or a predetermined-size block centering around a noticed pixel in a field; a second blocking means for forming a plurality of blocks arranged in a plurality of directions about the position of the present frame or that of the block formed in the field, difference value calculating means for calculating difference values between pixels in the block formed by the first blocking means and pixels in the blocks formed by the second blocking means; an absolute-value sum calculating means for calculating the sum of absolute values of difference values for each of a plurality of blocks; and a means for deciding the movement around a noticed pixel and outputting a first class code expressing movement by detecting the minimum value of absolute-value sums.

Figure 29:
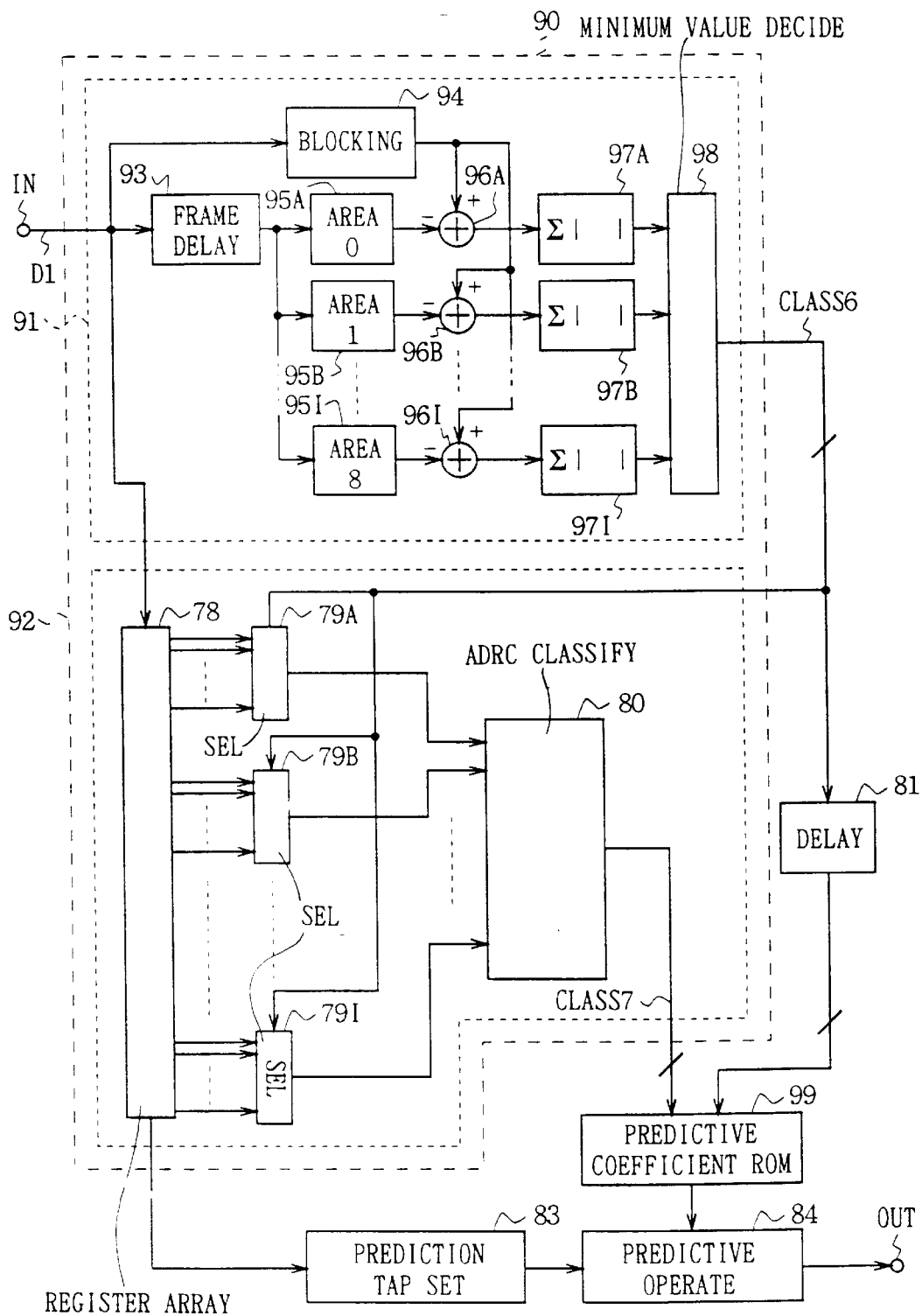
FIG. 29 is a block diagram showing the structure of the classifying circuit according to the fourth embodiment.

FIG. 29 shows a specific structure of a classifying circuit of the fourth embodiment. In FIG. 29 in which a portion corresponding to a portion in FIG. 22 is provided with the same symbol, a classifying circuit 90 of the fourth embodiment is constituted in the initial-stage classifying circuit 91 so as to calculate differences between a block mainly including the noticed pixel data in the present frame or field and a plurality of blocks cut out at a plurality of different positions in the past frame or field and perform rough classification by comparing the sums of absolute values of the differences.

The initial-stage classifying circuit 91 decides a direction from which a noticed pixel comes when input images move and roughly classifies the input images in accordance with the decision result. To accurately perform the above operations, it is necessary to perform movement detection. However, the number of operations increases when performing the movement detection by the block matching method. Therefore, the quantity of hardware extremely increases to perform rough classification at the initial stage.

Therefore, in the case of the fourth embodiment, the quantity of hardware is decreased by performing simple block matching of roughly diving a past block to be referenced into, for example, nine types of areas as shown in FIG.

30, calculating the absolute-value sum of differences for each pixel between each area and the block in the present frame or field. For example, when an image moves from right to left, the absolute-value sum of differences with a past area "3" tends to be minimized. Thus, it is possible to perform the rough classification at the initial stage with a small number of operations and resultingly, simplify the structure of the initial-stage classifying circuit 91.

Figure 30:
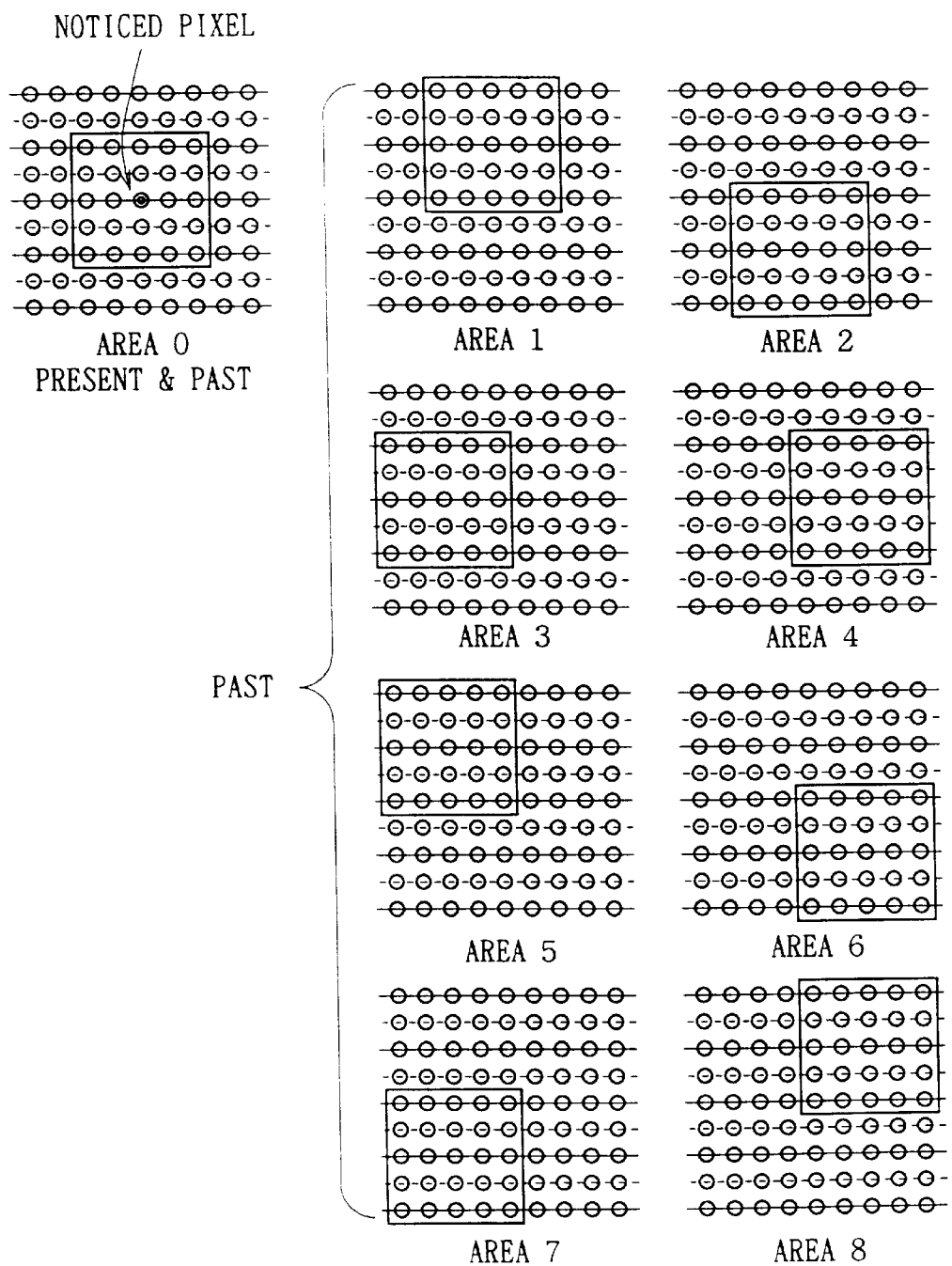
FIG. 30 is a schematic diagram explaining a movement-class forming operation of the fourth embodiment.

Practically, the initial-stage classifying circuit 91 of this embodiment transmits an input SD image to each of area dividing circuits 95A to 95I and sets past blocks with different positions in the area dividing circuits 95A to 95I as shown in FIG. 30. These past block data values and the present block data value centering around a noticed pixel obtained through the blocking circuit 94 are transmitted to each of difference circuits 96A to 96I. A difference value for each corresponding pixel obtained from each of the difference circuits 96A to 96I is transmitted to each of absolute-value sum circuits 97A to 97I and each difference absolute-value sum thus obtained is transmitted to a minimum value deciding circuit 98. The minimum value decision circuit 98 outputs the minimum difference absolute-value sum as a motion class code CLASS6 expressing a moving direction.

The next-stage classifying circuit 92 comprises the same structure as the next-stage motion classifying circuit 72 previously described in the third embodiment, has a plurality of selectors 79A to 79I for setting classification taps at the next stage as shown in FIGS. 25 to 27, and selects next-stage classification taps by alternatively selecting one of the selectors 79A to 79H or 79I corresponding to the motion class code CLASS6 obtained by the initial-stage classifying circuit 91 among the selectors 79A to 79I.

The above structure makes it possible to easily obtain a motion class and simplify the structure of the initial-stage classifying circuit 91 (first classifying means) because of performing simple block matching in which a plurality of reference blocks with different positions are previously set.

(5) Fifth Embodiment

The fifth embodiment realizes accurate classification by first generating a motion class in accordance with the movement of an input SD image basically similarly to the cases of the above first to fourth embodiments and then switching next-stage classification taps in accordance with the motion class. However, this embodiment is different from the first to fourth embodiments in the way of generating a motion class.

In the case of the fifth embodiment, a first classifying means calculates the inter-frame difference value between a predetermined-size block cut out from a frame in which a noticed pixel is present and a block cut out from a frame adjacent to the above frame and located at the spatially same position as the above block, comparing the average value of the absolute values of the inter-frame difference value with a predetermined threshold value set previously, and deciding the movement around the noticed pixel in accordance with the comparison result to generate a class code expressing a motion class.

Figure 31:
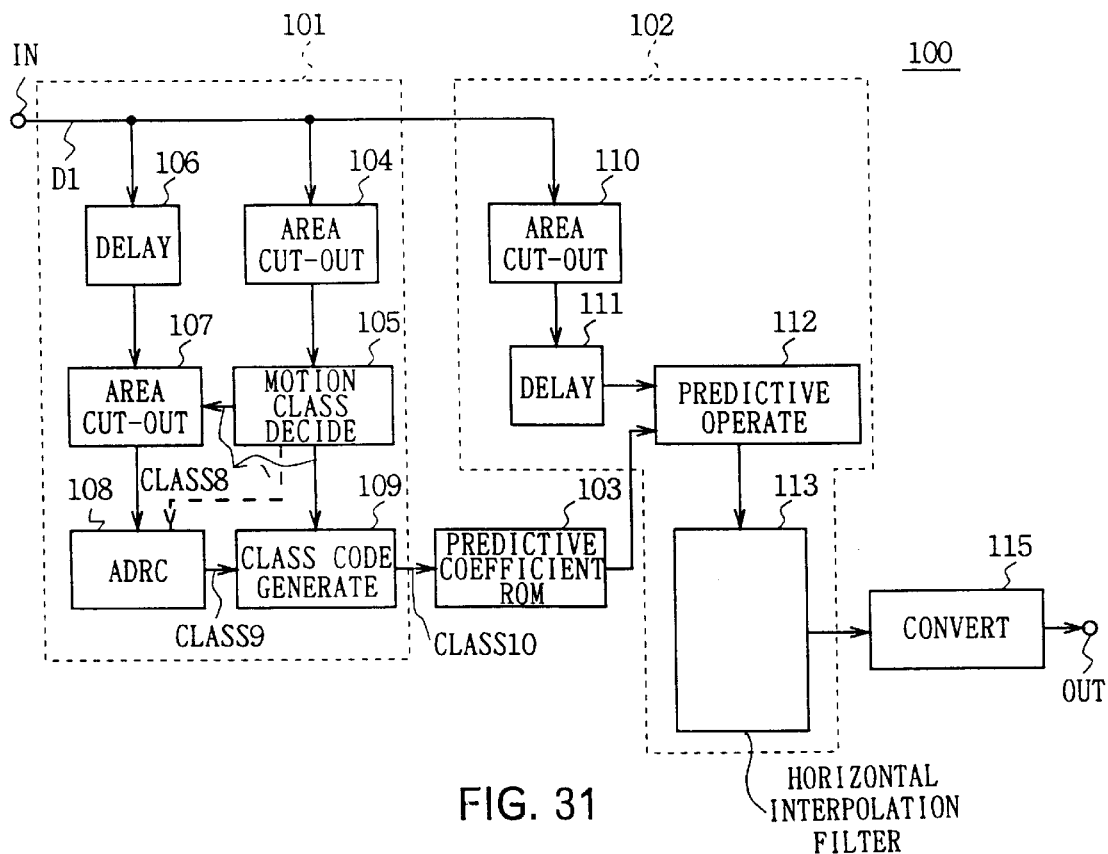
FIG. 31 is a block diagram showing the structure of the up-converter of the fifth embodiment.

FIG. 31 shows a specific structure of the up-converter of the fifth embodiment. The up-converter 100 roughly comprises: a classifying circuit 101 for classifying noticed pixels of the input SD image data D1; a predictive coefficient ROM 103 for outputting a predictive coefficient corresponding to the above classification result; and a predictive operating circuit 102 for generating HD interpolation pixel data in the vertical direction by performing predictive operation SD image D1 by using the output predictive coefficient and the input SD image data D1.

Figure 32:
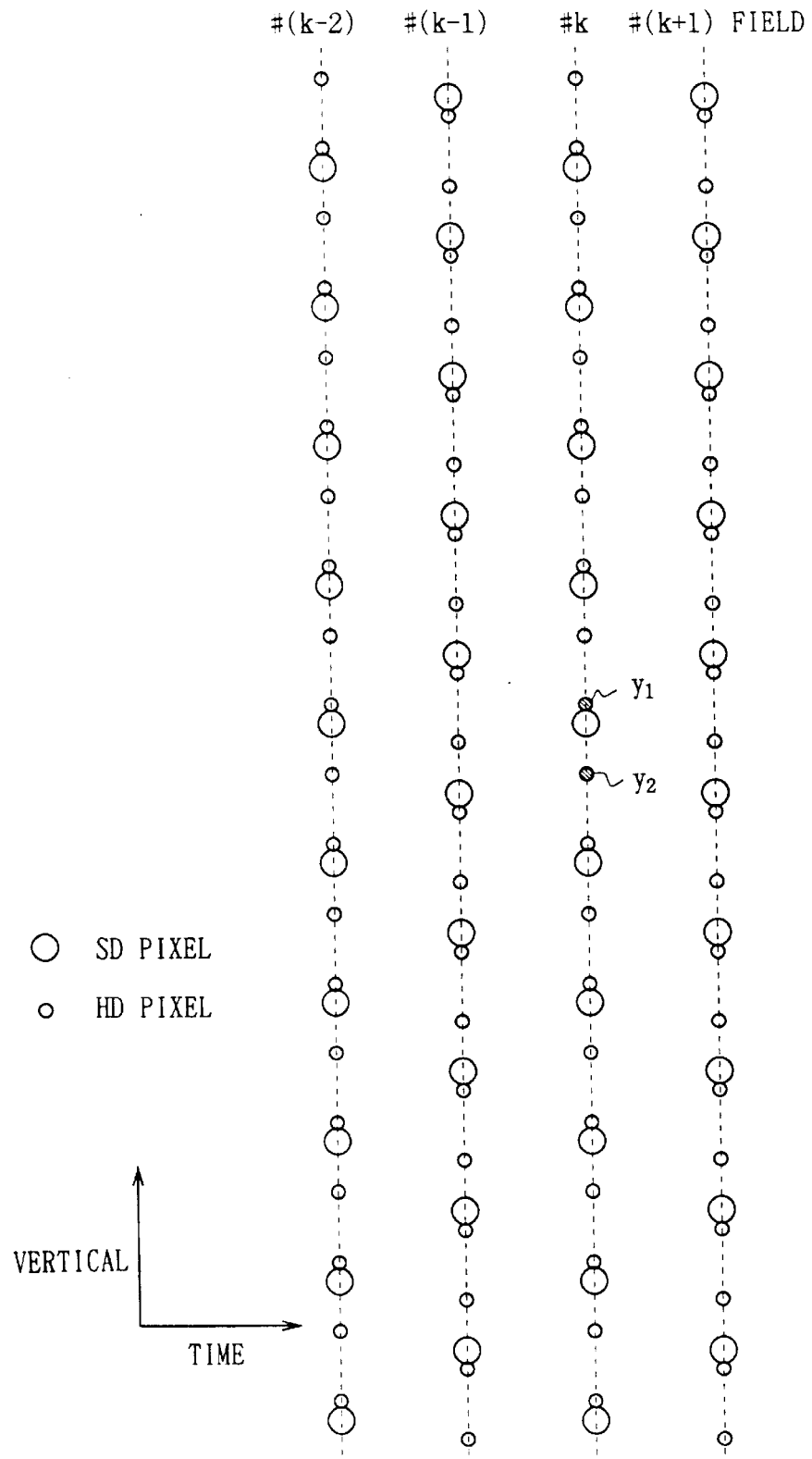
FIG. 32 is a schematic diagram showing the positional relation between SD pixel and HD pixel.

FIG. 32 shows the positional relation between SD pixel and HD pixel to be interpolated in the fifth embodiment. That is, the HD pixel to be interpolated includes the following two types in the same field: an HD pixel $y_1$ present nearby the SD pixel and an HD pixel $y_2$ remote from the SD pixel. Hereafter, a mode for estimating the HD pixel present nearby the SD pixel is referred to as mode 1 and a mode for estimating the HD pixel remote from the SD pixel is referred to as mode 2.

Figure 33:
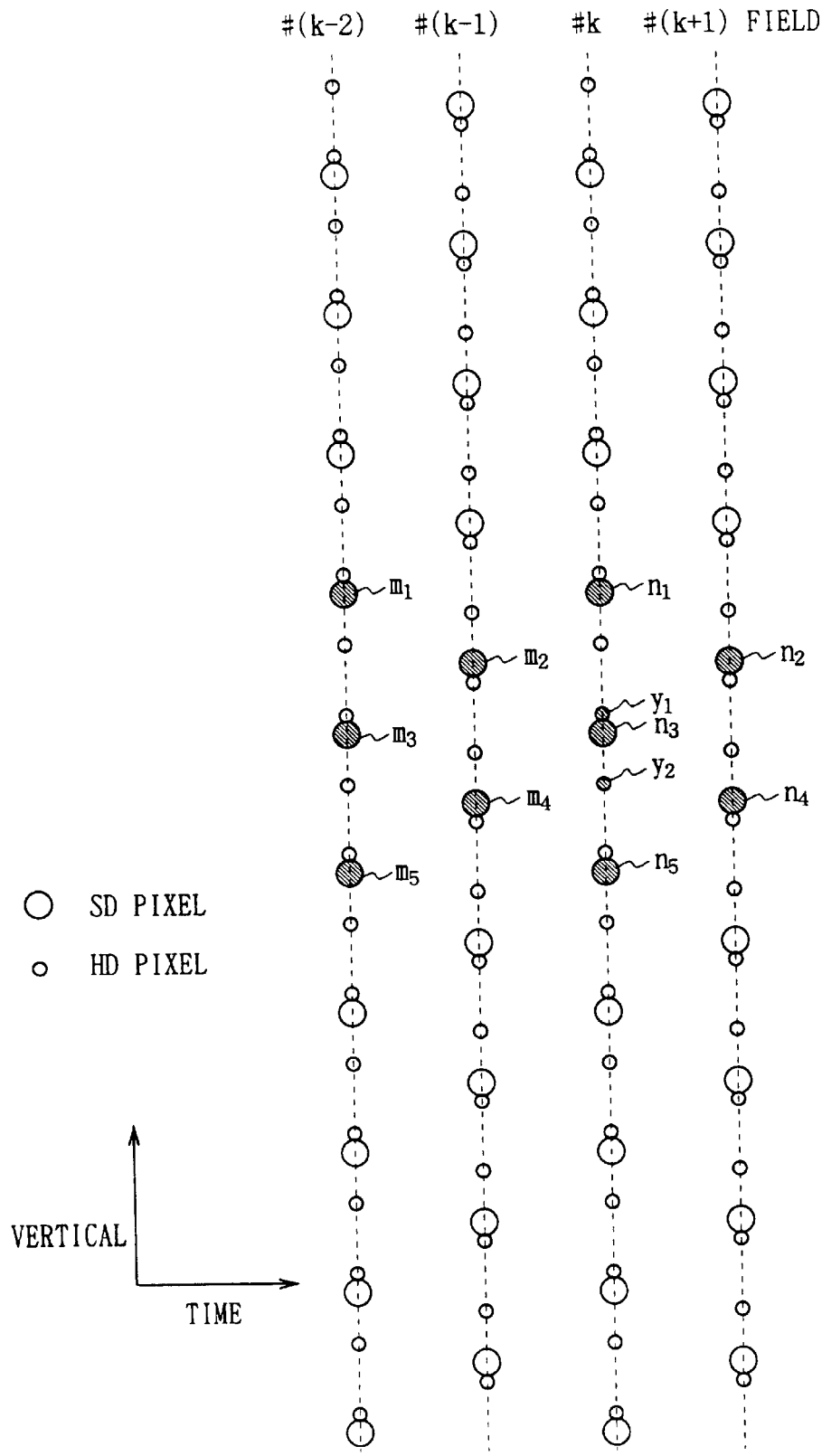
FIG. 33 is a schematic diagram showing SD pixels used for movement class classification in the fifth embodiment.

The up-converter 100 inputs the SD image data D1 supplied from an input terminal to an area cut-out circuit 104. The area cut-out circuit 104 cuts out a pixel necessary for classification (motion class) to express the degree of movement. In the case of this embodiment, ten SD pixels $m_1$ to $m_5$ and $n_1$ to $n_5$ present at the positions shown in FIG. 33 are cut out from the supplied SD image to the HD pixels $y_1$ and $y_2$ to be interpolated.

The data cut out from the area cut-out circuit 104 is supplied to a motion class deciding circuit 105. The motion class deciding circuit 105 calculates the inter-frame differences of the supplied SD pixel data and calculates a motion parameter by deciding the threshold value of the average value of the absolute values of the differences. Specifically, the motion class deciding circuit 105 calculates the average value param of the absolute values of the differences from the supplied SD pixel data in accordance with the following equation (10).

$$param = \frac{\sum_{i=1}^{n} |m_i - n_i|}{n} \quad (10)$$

In the case of this embodiment, n equals 5.

The motion class deciding circuit 105 obtains a motion class code CLASS8 by comparing the average value param thus calculated with a predetermined threshold value. In this case, it is possible to generate a motion class code CLASS8 consisting of four classes by assuming a case in which the average value param is "2" or less as class "0", a case in which the average value param is larger than "2" and equal to or less than "4" as class "1", a case in which the average value param is larger than "4" and equal to or less than "8" as class "2", and is larger than "8" as class "3", and a case in which param is "2" or less as class "3". Moreover, it is possible to set threshold values used for the above cases by dividing, for example, a histogram of absolute values of differences of SD pixel data into n equal parts.

The motion class code CLASS8 thus generated is transmitted to an area cut-out circuit 107 and a class code generating circuit 109. The input SD image data D1 is supplied to the area cut-out circuit 107 through a delay circuit 106 for delaying the input SD image data D1 by the processing time by the area cut-out circuit 104 and the motion class deciding circuit 105. The SD image data cut out by the area cut-out circuit 107 is supplied to an ADRC circuit 108 and the in-space waveform of the SD image data is patterned (in-space-classified) to a waveform with less number of bits by the ADRC circuit 108. For example, SD image data of 8 bits per pixel is compressed to SD image data of 2 bits per pixel.

In the case of in-space classification, a method of using pixels equivalent to two fields or more is effective and efficient for an image with a small movement. However, a method of using pixels in one field is effective and efficient for an image with a large movement. Therefore, the area cut-out circuit 107 cuts out, for example, five SD pixels $k_1$ to $k_5$ at the positions shown in FIG. 34 as pixels used for in-space classification (that is, as classification taps) when the motion class code CLASS8 is class "0" or class "1". However, when the motion class code CLASS8 is class "2" or class "3", the area cut-out circuit 107 cuts out five SD pixels $k_1$ to $k_5$ at the positions shown in FIG. 35 as pixels used for in-space classification.

The pixel data compressed by the ADRC circuit 108 is supplied to the class code generating circuit 109 as an ADRC class code CLASS9. The class code generating circuit 109 detects the final class to which the block concerned belongs by performing the operation of the following equation (11) in accordance with the ADRC class code CLASS9 and the motion class code CLASS8 and outputs a class code CLASS10 showing the class as the read address of the predictive coefficient ROM 103.

$$CLASS10 = \sum_{i=1}^{n} g_i(2^p)^i + (CLASS8) \cdot 2^{pn} \quad (11)$$

In the above equation (11), $g_i$ represents each pixel data value re-quantized through ADRC, p represents bit assignment at the time of ADRC, and n equals 5 and p equals 2. In this connection, a predictive coefficient in mode 1 corresponding to the HD pixel $y_1$ and a predictive coefficient in mode 2 corresponding to the HD pixel $y_2$ are independently prepared for the predictive coefficient ROM 103 of the fifth embodiment.

Figure 36:
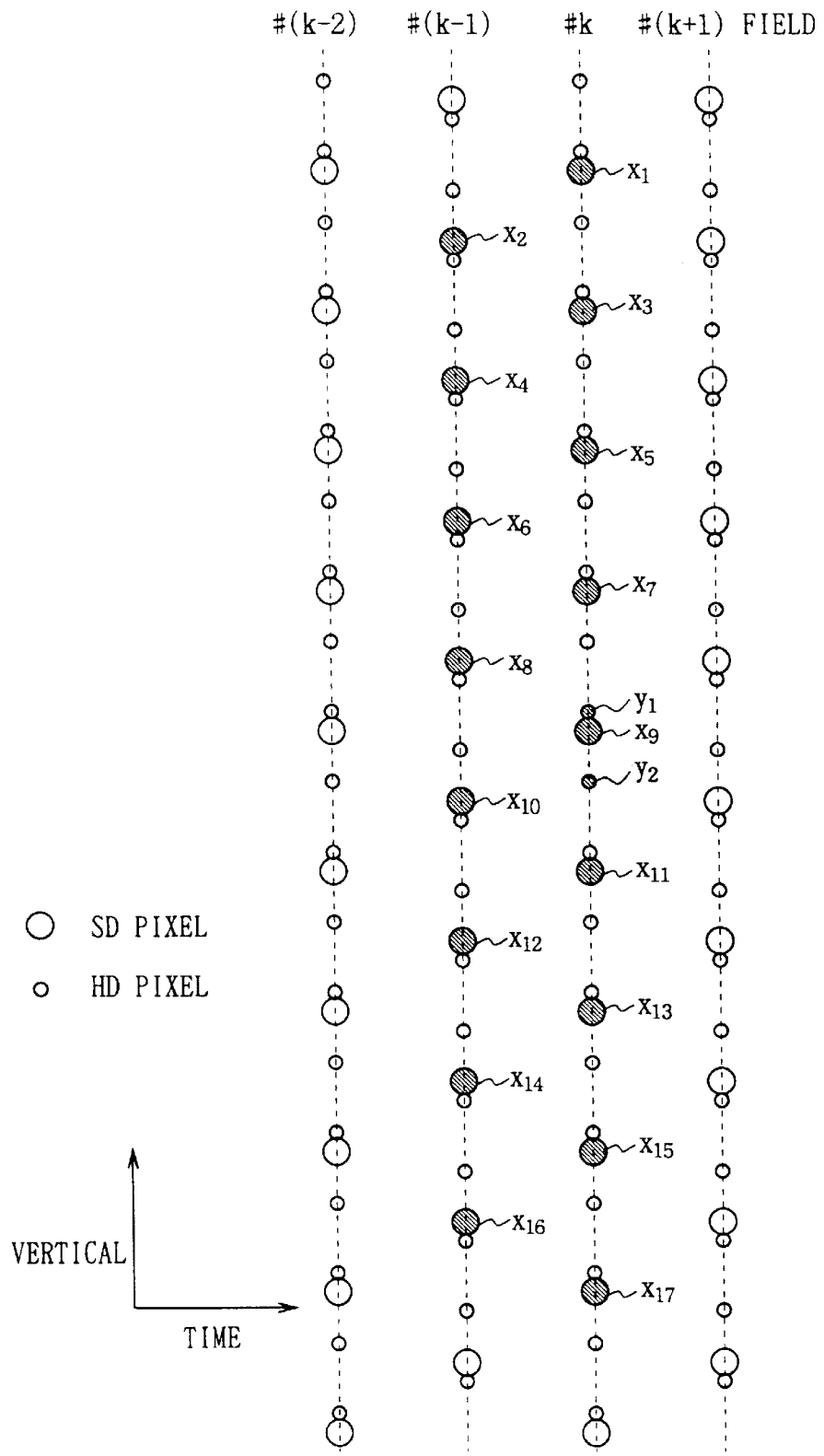
FIG. 36 is a schematic diagram showing prediction tap patterns in the fifth embodiment.

The input SD image data D1 supplied from an input terminal is also supplied to an area cut-out circuit 110. The area cut-out circuit 110 cuts out the SD image data (that is, prediction taps) used for predictive operation from input data. In the case of this embodiment, the circuit 110 cuts out 17 pixels $x_1$ to $x_{17}$ at the positions shown in FIG. 36 as prediction taps. Outputs of the area cut-out circuit 110 are supplied to a predictive operating circuit 112 through a delay circuit 111 prepared for timing adjustment. The predictive operating circuit 112 calculates the HD interpolation pixel data $y_1$ and $y_2$ corresponding to noticed SD pixel data by using supplied predictive coefficients and prediction taps and thereby performing the linear primary operation.

The HD interpolation pixel data output from the predictive operation circuit 112 is supplied to a horizontal interpolation filter 113. The horizontal interpolation filter 113 doubles the horizontal number of pixels through interpolation. The HD interpolation pixel data such as mode1 to mode4 in FIG. 8 is finally generated by the horizontal interpolation and supplied to a converting circuit 115. The converting circuit 115 converts the supplied HD interpolation pixel data to time-sequential data and the output is supplied to an HD television picture tube and an HD video tape recorder.

Note that, in the ADRC circuit, a pixel area detecting a dynamic range may be taken wider than a set pixel pattern, further, the pixel area may be determined in accordance with the motion class code CLASS8.

Also, in the ADRC circuit 108, the number of quantization bits may be switched in accordance with the motion class code CLASS8.

Figure 37:
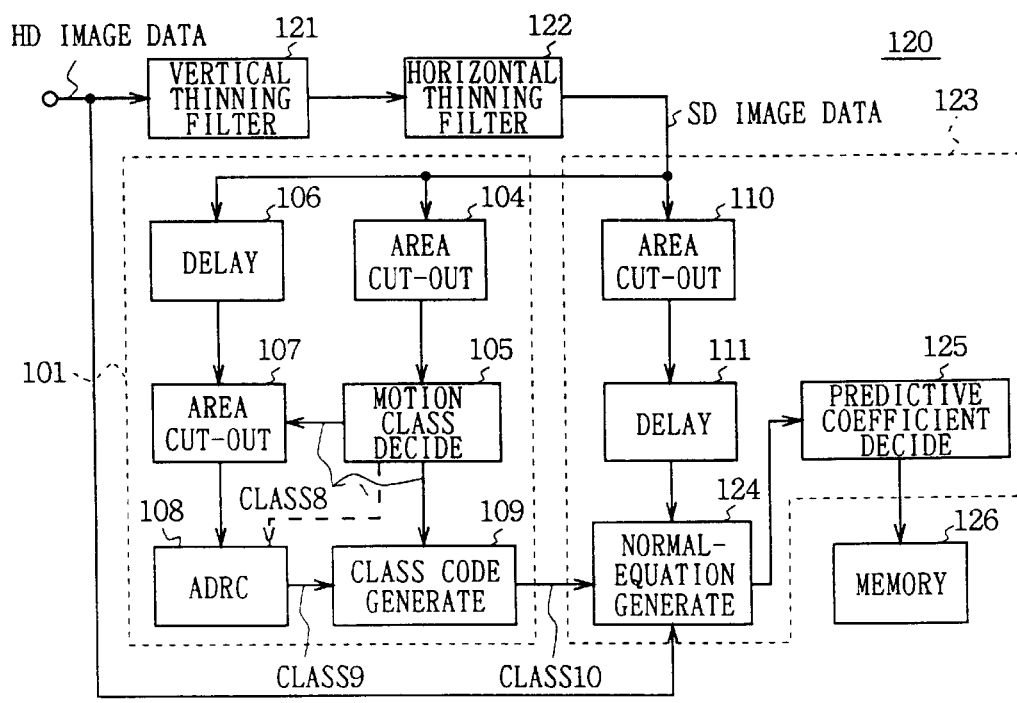
FIG. 37 is a block diagram showing the structure of the learning circuit of the fifth embodiment.

Then, the structure of a learning circuit is described below which generates the predictive coefficients stored in the predictive coefficient ROM 103 of this embodiment. As shown in FIG. 37 in which a portion corresponding to a portion in FIG. 31 is provided with the same symbol, the learning circuit 120 first forms an SD image with pixels ¼ smaller than the number of pixels of an already-known HD image corresponding to the HD image. Specifically, the circuit 120 obtains SD image data by thinning vertical-directional pixels of the HD image data supplied through an input terminal by a vertical thinning filter 121 so that the vertical-directional frequency is halved and moreover, thinning the horizontal-directional pixels of the HD image data by a horizontal thinning filter 122.

Figure 9:
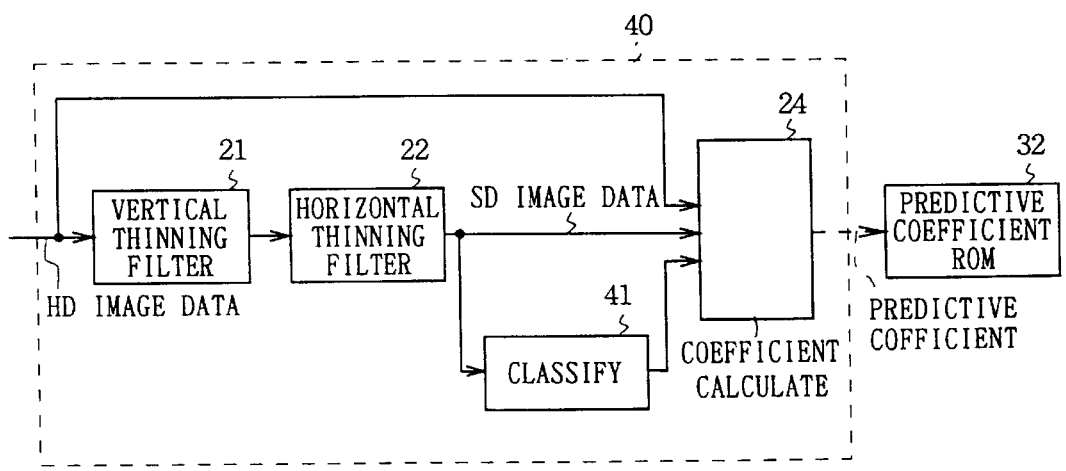
FIG. 9 is a block diagram showing the structure of the learning circuit of an embodiment.

The SD image data is supplied to the classifying circuit 101 and also supplied to a coefficient calculating circuit 123 corresponding to the coefficient selecting circuit 24 in FIG. 9. Moreover, a class code CLASS10 generated by the classifying circuit 101 is supplied to a normal-equation generating circuit 124 of the coefficient calculating circuit 123. The normal-equation generating circuit 133 generates normal equation data for each class shown by the class code CLASS10 in accordance with the above equations (2) to (9). At this time, normal equation data is generated to each of mode 1 and mode 2.

After input of all learning data is completed, the normal-equation generating circuit 124 outputs the normal equation data to mode 1 and mode 2 to a predictive coefficient deciding circuit 125. The predictive coefficient deciding circuit 125 solves a normal equation about a predictive coefficient in mode 1 and mode 2 by using a general matrix solution such as the sweeping-out method and outputs the predictive coefficient in mode 1 and mode 2 to a memory 126. As a result, a predictive coefficient allowing estimation statistically closest to a true value when estimating noticed HD interpolation pixel data $y_1$ and $y_2$ for each class is stored in the memory 126. Thus, it is possible to use the predictive coefficient ROM 103 of the up-converter 100 for a table stored in the memory 126.

The above structure makes it possible to obtain a classification result based on a level distribution pattern and well reflecting the feature of an input image because of adaptively selecting a classification tap pattern used for the classification based on the level distribution pattern correspondingly to a motion class. Moreover, as the result of calculating inter-frame differences of an SD image, deciding the threshold of the average value of the absolute values of the differences, and thereby obtaining a motion class, it is possible to easily obtain the motion class and simplify the structure of the classifying circuit 101.

(6) Sixth Embodiment

For the above first to fifth embodiments, a case is described in which a motion class is generated to adaptively select a classification tap used for the classification based on a level distribution pattern in accordance with the motion class. In the case of the sixth embodiment, however, a prediction tap used for predictive operation is adaptively selected in accordance with a motion class.

Figure 38:
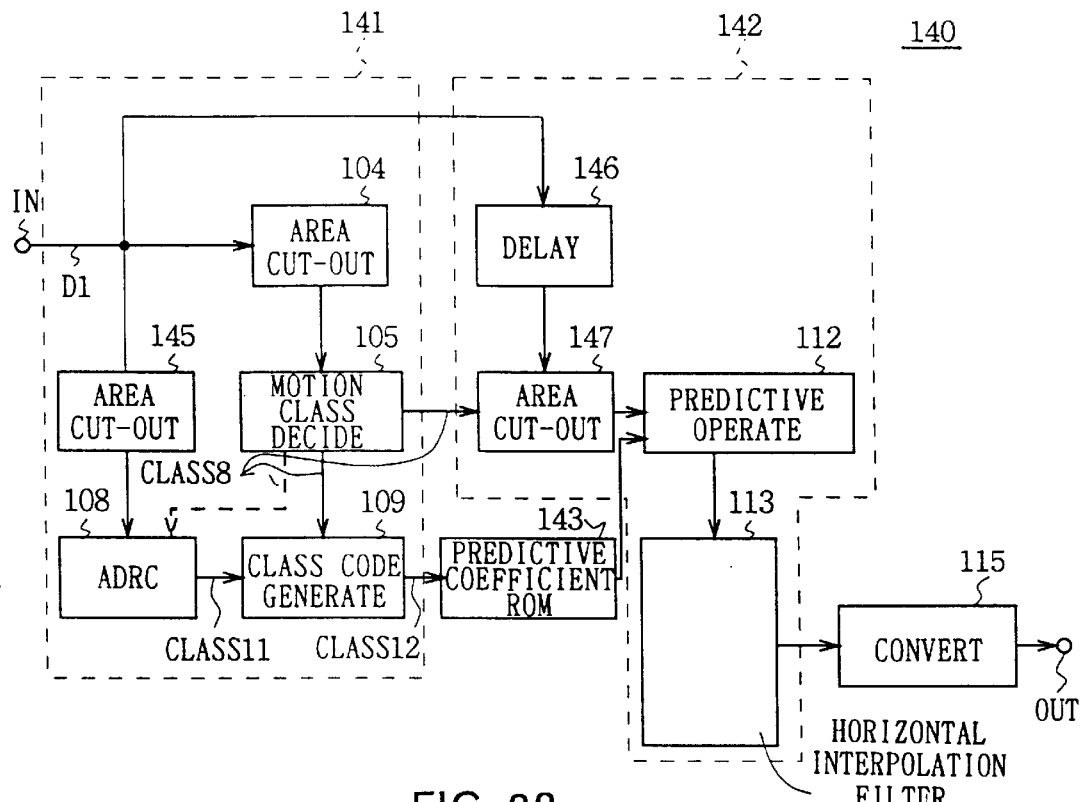
FIG. 38 is a block diagram showing the structure of the up-converter of the sixth embodiment.

Practically, an up-converter of the sixth embodiment is constituted as shown in FIG. 38. In FIG. 38 in which a portion corresponding to a portion in FIG. 31 is provided with the same symbol, a motion class deciding circuit 105 set to a classifying circuit 141 of an up-converter 140 transmits the motion class code CLASS8 obtained by the same method as that of the fifth embodiment to a class code generating circuit 109 and also to an area cut-out circuit 147 of a predictive operating circuit 142.

Figure 40:
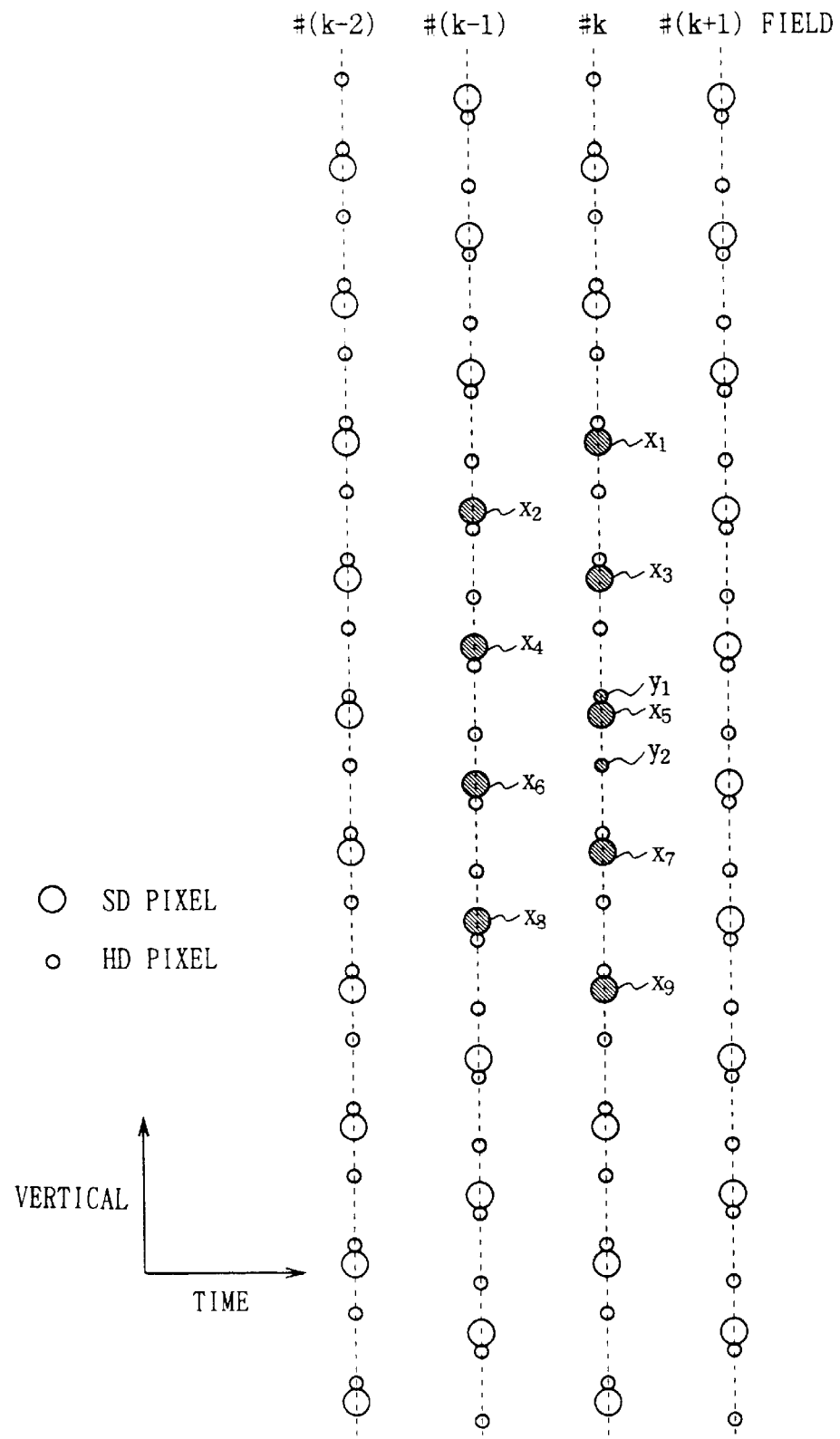
FIGS. 40 to 42 are schematic diagrams showing prediction tap patterns selected by the predictive operated pixel selecting circuit of the sixth embodiment.
Figure 41:
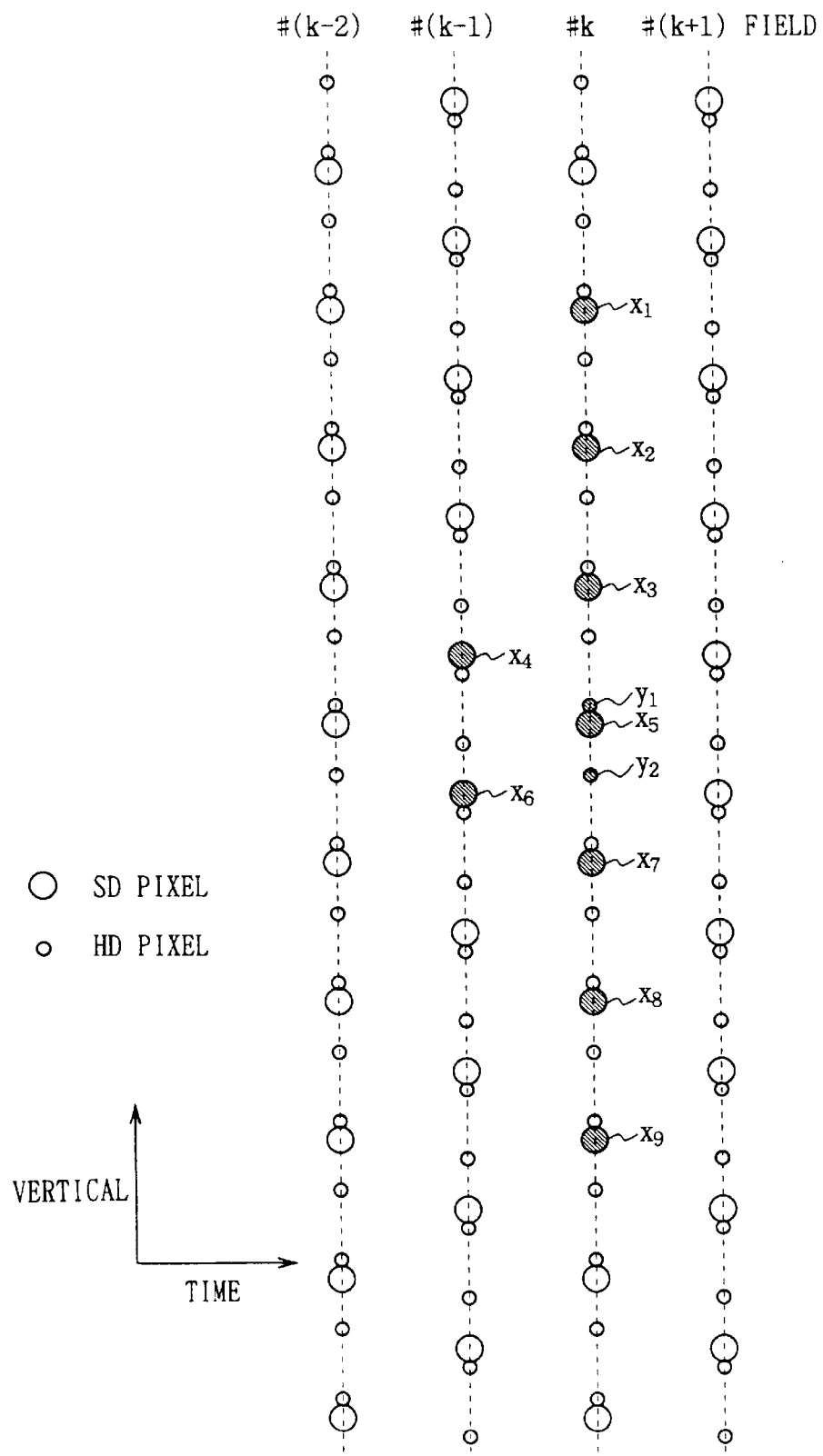
Figure 42:
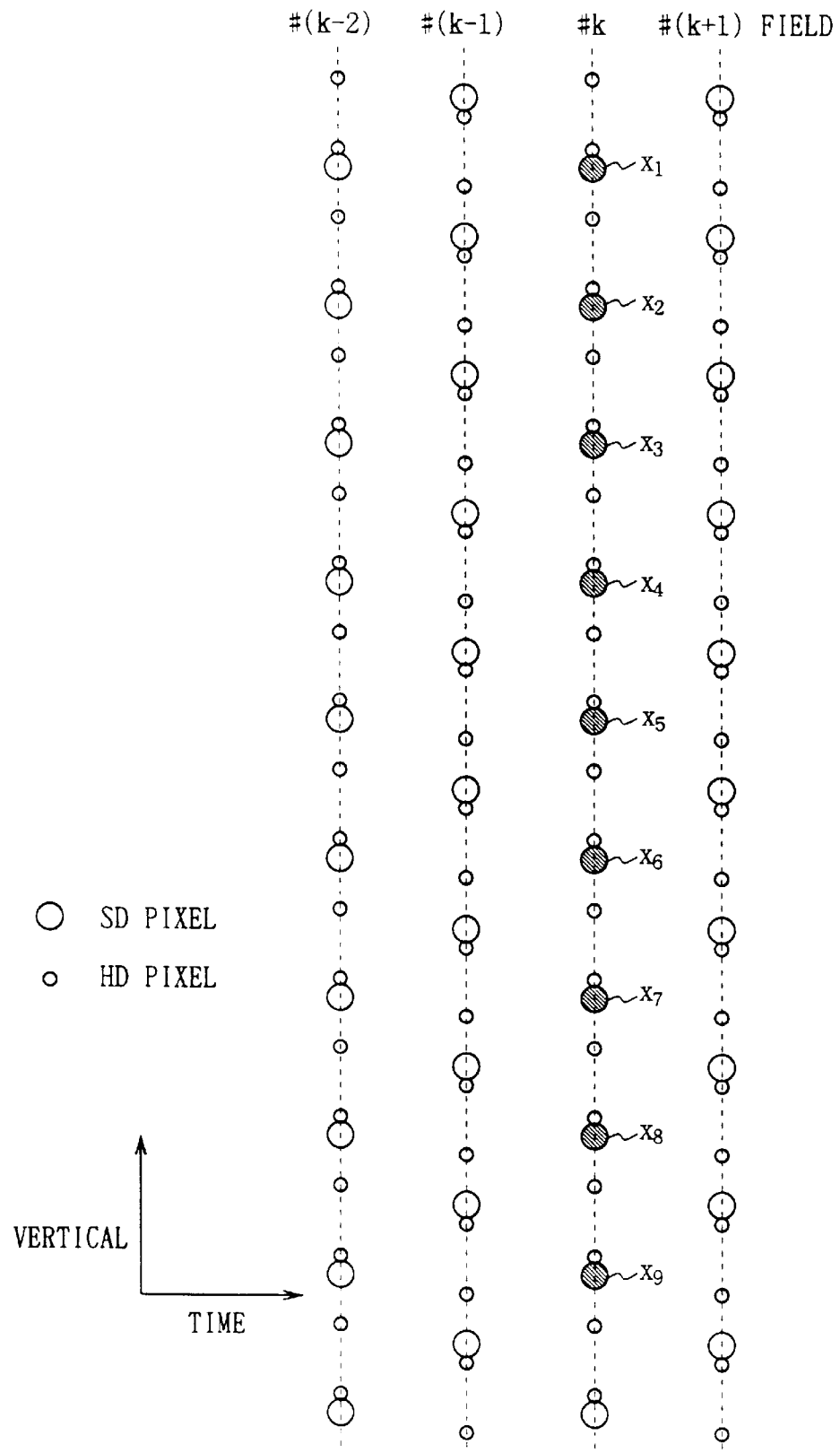

The area cut-out circuit 147 cuts out a prediction tap corresponding to the motion class code CLASS8 from the SD image data supplied through a delay circuit 146 for timing adjustment. That is, when the motion class code CLASS8 represents a small movement such as class "0" or class "1", the circuit 147 cuts out, for example, nine SD pixels $x_1$ to $x_9$ at the positions shown in FIG. 40 as prediction taps. However, when the motion class code CLASS8 represents a large movement such as class "2", the circuit 147 cuts out, for example, nine SD pixels $x_1$ to $x_9$ at the positions shown in FIG. 41 as prediction taps. Moreover, when the motion class code CLASS8 represents a very large movement such as class "3", the circuit 147 cuts out nine SD pixels $x_1$ to $x_9$ at the positions shown in FIG. 42 as prediction taps. As a result, the optimum prediction tap according to the movement of an input SD image serving as an object of classification is supplied to the predictive operating circuit 112.

In this case, conventional predictive operation always uses the same pixel as a prediction tap independently of a classified class. Therefore, the problem occurs that the number of pixels constituting a prediction tap increases and the scale of hardware increases when stressing the prediction performance and the problem occurs that the prediction performance deteriorates when decreasing the scale of hardware.

However, because the up-converter 140 of the sixth embodiment adaptively selects a prediction tap in accordance with the motion class code CLASS8, it is possible to improve the prediction performance with a simple structure. That is, the up-converter 140, as described above, is constituted so as to set only a prediction tap suitable for predictive operation without indiscriminately increasing the number of prediction taps by selecting an SD pixel spatially close to an HD pixel to be interpolated as a prediction tap for a small movement and selecting an SD pixel temporally close to an HD image to be interpolated for a large movement.

Figure 34:
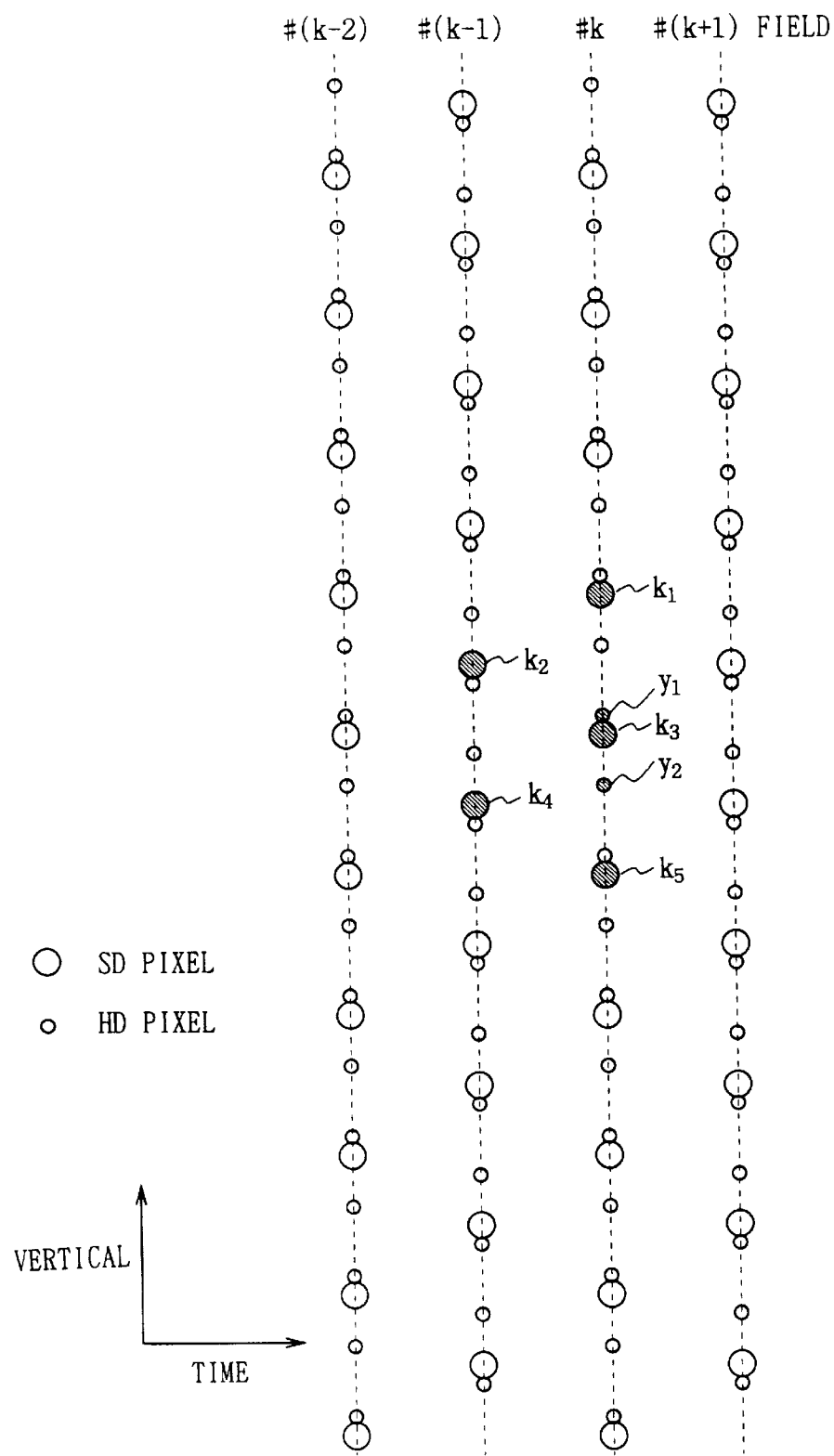
FIGS. 34 and 35 are schematic diagrams showing classification tap patterns selected by the classified pixel selecting circuit of the fifth embodiment.
Figure 35:
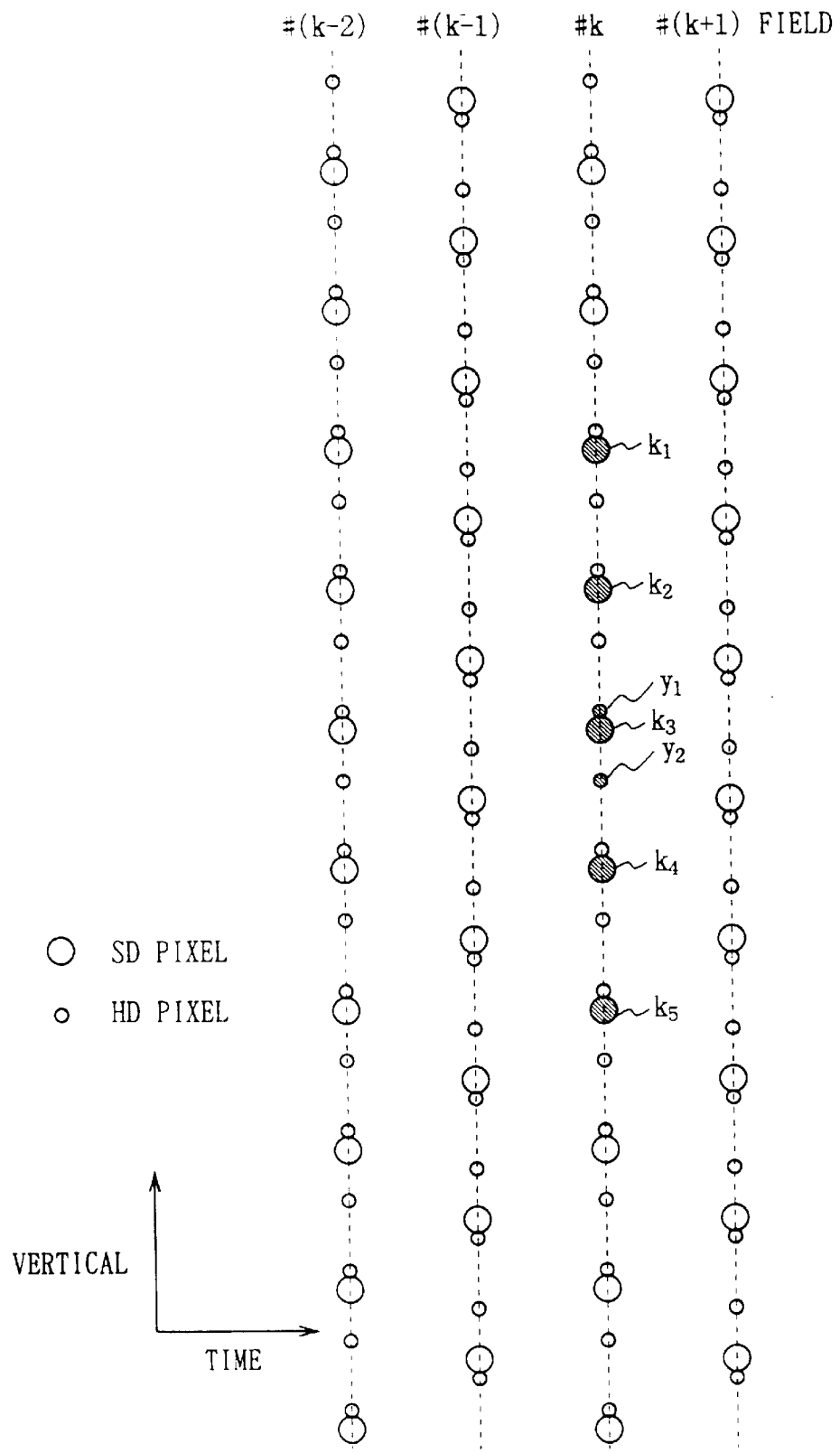

Moreover, the area cut-out circuit 145 of the sixth embodiment for cutting out a classification tap cuts out five SD pixels $k_1$ to $k_5$ located nearby HD pixels $y_1$ and $y_2$ to be interpolated as shown in FIG. 34. That is, the area cut-out circuit 145 is different from the case of the fifth embodiment in the fact of cutting out a fixed classification tap independently of movement.

Figure 39:
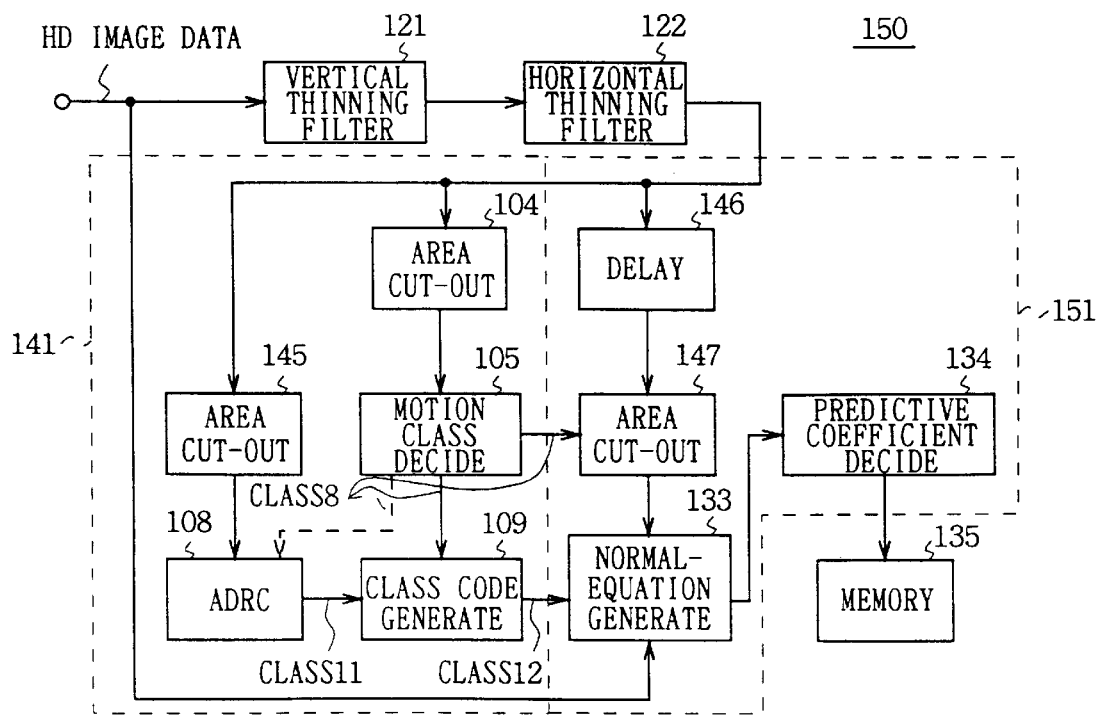
FIG. 39 is a block diagram showing the structure of the learning circuit of the sixth embodiment.

Then, a learning circuit for generating a predictive coefficient ROM 143 (FIG. 38) of the sixth embodiment is described below. As shown in FIG. 39 in which a portion corresponding to a portion in FIG. 38 is provided with the same symbol, a predictive coefficient calculating circuit 151 of a learning circuit 150 cuts out an SD pixel corresponding to a motion class code CLASS8 decided by the motion class deciding circuit 105 and transmits the SD pixel to a normal-equation generating circuit 133. The normal-equation generating circuit 133 receives a class code CLASS12 obtained by the class code generating circuit 109 in accordance with the motion class code CLASS8 and an ADRC class code CLASS11 obtained from a fixed classification tap.

The normal-equation generating circuit 133 sets up a normal equation for each class code CLASS12 as described above and transmits it to a predictive coefficient deciding circuit 134. A predictive coefficient obtained by the predictive coefficient deciding circuit 134 is stored in a memory 135. Thus, the learning circuit 150 makes it possible to generate an accurate predictive coefficient because of adaptively selecting a prediction tap used for learning in accordance with a motion class.

The above structure realizes an up-converter with a small scale of hardware and a high prediction performance because of forming a prediction tap only with pixels important for predictive operation in accordance with a motion class.

Note that, in the ADRC circuit, a pixel area detecting a dynamic range may be taken wider than a set pixel pattern, further, the pixel area may be determined in accordance with the motion class code CLASS8.

Also, in the ADRC circuit 108, the number of quantization bits may be switched in accordance with the motion class code CLASS8.

(7) Seventh Embodiment

A case is described in which a classification tap is adaptively selected in accordance with a motion class for the above first to fifth embodiments and a case is described in which a prediction tap is adaptively selected in accordance with a motion class for the above sixth embodiment. However, this seventh embodiment adaptively selects both classification tap and prediction tap in accordance with a motion class.

Figure 43:
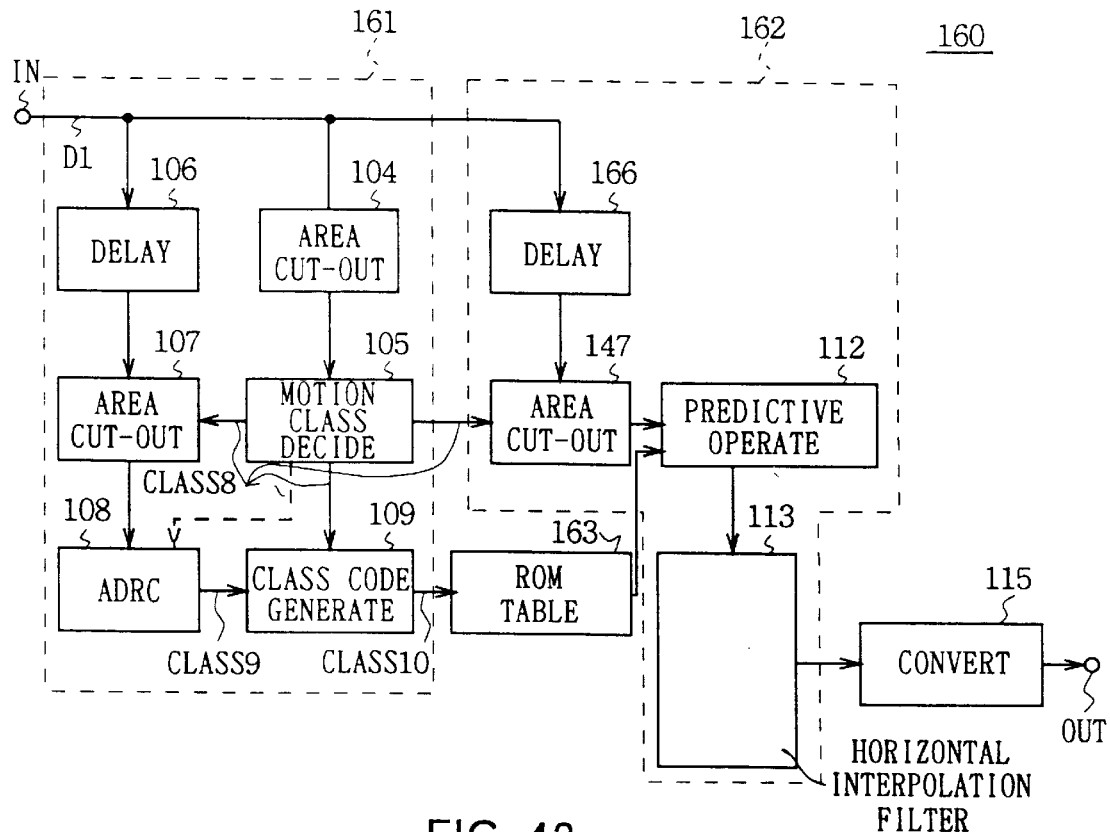
FIG. 43 is a block diagram showing the structure of the up-converter according to the seventh embodiment.
Figure 44:
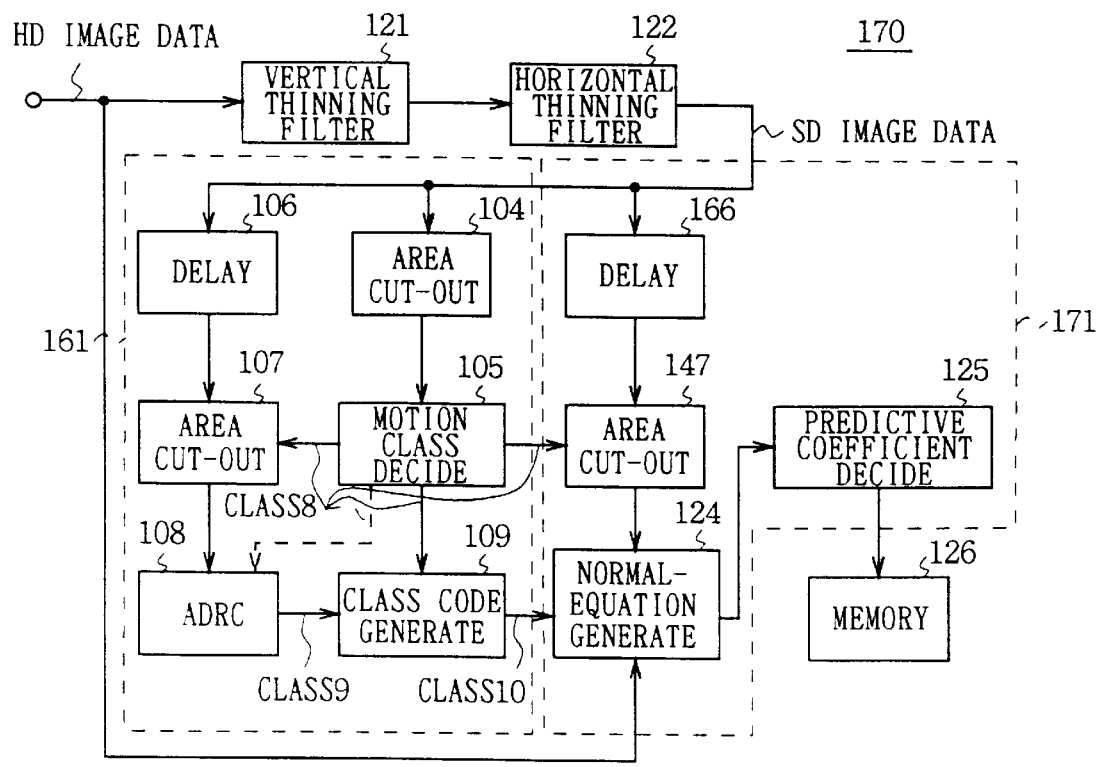
FIG. 44 is a block diagram showing the structure of the learning circuit according to the seventh embodiment.

FIGS. 43 and 44 show the structure of an up-converter and that of a learning circuit of the seventh embodiment respectively. In FIG. 43 in which a portion corresponding to FIGS. 31 and 38 is provided with the same symbol, a class deciding circuit 164 of an up-converter 105 transmits the decided motion class code CLASS8 to the area cut-out circuit 107 for cutting out a classification tap and also to the area cut-out circuit 147 for cutting out a prediction tap. The area cut-out circuit 107 cuts out a classification tap corresponding to the motion class code CLASS8 as described in the above fifth embodiment. The area cut-out circuit 147 cuts out a prediction tap corresponding to the motion class code CLASS8 as described in the above sixth embodiment.

Thus, the learning circuit of the seventh embodiment makes it possible to obtain a further accurate predictive coefficient and the up-converter of the seventh embodiment makes it possible to obtain an HD interpolation pixel closer to a true value.

(8) Other Embodiments

For the above embodiments, a case is described in which the present invention is applied to an up-converter for converting SD image data to HD image data. However, the present invention is not only limited to the above up-converter but also widely be applied to cases of converting low-resolution image data to high-resolution image data. That is, in the case of the above embodiments, the present invention is applied to a case of creating a pixel not included in an SD image. However, the present invention can also be applied to a case of expressing each pixel of 8 bits by a higher-resolution pixel of 10 bits. In this case, it is necessary to previously obtain predictive coefficient data for each class through the learning using a pixel of 10 bits to perform predictive operation by using predictive coefficient data corresponding to a result classified by using 8-bit pixels.

Moreover, the present invention can also be applied to an interpolating method of a sub-sampled image signal, and an interpolating method of a signal on magnification such as electronic zooming.

Moreover, for the above embodiments, a case is described in which high-resolution image data is generated in accordance with a classification result by using predictive coefficient storage circuit for storing predictive coefficient data for each class code obtained by combining first and second class codes and using predictive operating circuit for performing predictive operation with predictive coefficient data output from the predictive coefficient storage circuit and input image data. However, the present invention is not only limited to the above case but also be applied to a case in which predicted value storage circuit storing a predicted value for each class code obtained by combining first and second class codes is used instead of the predictive coefficient storage circuit and predictive operating circuit. In this case, a predicted value stored in the predicted value storage circuit corresponds to an estimated interpolation pixel value output from the predictive operation circuit. Such a method has been proposed in the specification and the drawings of the Japanese Application Laid-open No. 5-328185 which corresponds to the U.S. application Ser. No. 08/1,730 filed on May 17, 1993, by the present applicants.

That is, in the up-convertor of FIG. 8, it has the same structure in the classifying circuit, however, a prediction ROM in which a predicted value has been stored is arranged instead of the predictive coefficient ROM 32, and a predicted value read out in accordance with a class code is directly supplied to the converting circuit as an estimated interpolation pixel value.

A learning method using a weighted mean is the first method for obtaining a predicted value. More minutely, this is a method of obtaining a predicted value corresponding to each class by performing the above classification with SD pixels around a pixel to be interpolated and applying the processing of dividing a pixel value (HD pixel value) of a pixel to be interpolated accumulated for each class by the frequency incremented by the number of pixels to be interpolated to various images. A learning method according to normalization is the second method for obtaining a predicted value. More minutely, this is a method of obtaining a predicted value corresponding to each class by forming a block comprising a plurality of pixel including a pixel to be interpolated, normalizing a value obtained by subtracting the reference value of the block from the value of the pixel to be interpolated by the dynamic range in the block, and applying the processing of using a predicted value obtained by diving an accumulated value of the normalized value by an accumulated frequency as a predicted value to various images.

Moreover, for the above first to fourth embodiments, a case is described in which a second classifying unit adaptively selects a pixel used for classification in accordance with a first class code (motion class code) formed in accordance with the movement around a noticed pixel in input image data by a first classifying unit. In the case of the first to fourth embodiments, however, it is also possible for predictive operation means to adaptively select a pixel used for predictive operation in accordance with the first class code as described in the sixth embodiment. Moreover, as described in the seventh embodiment, it is possible to adaptively select both pixel used for classification by the second classifying unit and pixel used for predictive operation by the predictive operating circuit in accordance with the first class code. Thus, it is possible to generate higher-resolution image data.

Furthermore, for the above embodiments, a case is described in which an ADRC circuit is used as a second classifying means for outputting a second class code in accordance with the level distribution pattern of a plurality of pixels spatially and/or temporally present around a noticed pixel. However, the second classifying means of the present invention is not limited to the ADRC circuit. It is also possible to use a compression method such as discrete cosine transform (DCT) coding, DPCM (differential coding), vector quantization, sub-band coding, or wavelet conversion.

Furthermore, for the above embodiments, a case is described in which the block matching method, the method of comparing an inter-frame difference value with a predetermined threshold value, the method of obtaining a movement direction by detecting the minimum value of prediction errors in predicted values obtained by corresponding to a plurality of movements, or the simple block matching method is used as a classifying method in the first classifying unit for classifying noticed pixels in accordance with the movement around a noticed pixel in input image data. However, the present invention is not limited to the above case. It is also possible to obtain a motion class by using, for example, the gradient method or phase correlation method. In short, it is possible to use a method capable of classifying the movement around a noticed pixel into any one of a predetermined number of classes in accordance with the direction or magnitude of the movement.

Furthermore, for the above embodiments, a case is described in which a read only memory (ROM) is used as a predictive coefficient storage circuit. However, the present invention is not limited to the ROM. It is also possible to use a random access memory (RAM) or SRAM instead of the ROM.

As described above, the present invention makes it possible to perform a proper classification adaptive processing considering various signal characteristics of input image data and convert low-resolution input image data to higher-resolution image data because of using: a first classifying means for classifying noticed pixels in accordance with the movement around the noticed pixels in input image data and outputting a first class code showing the classification result; a second classifying means for classifying noticed pixels in accordance with the level distribution pattern of a plurality of pixels spatially and/or temporally present around the noticed pixels and outputting a second class code showing the classification result, predictive coefficient storage means for storing predictive coefficient data serving as the information for converting input image data to high-resolution image data for each class code obtained by combining first and second class codes and outputting predictive coefficient data corresponding to the first and second class codes; and a predictive operating means for generating high-resolution image data by performing predictive operation with the predictive coefficient data output from the predictive coefficient storage means and a plurality of pixels spatially and/or temporally present around noticed pixels.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image signal converting apparatus for converting a first input image signal to a second image signal different from said first image signal, comprising:
   a class code deciding means for deciding the class of a noticed pixel in accordance with the movement indicated by a change of at least one pixel in the vicinity of the noticed pixel between at least a first input image and a second input image of said first input image signal and patterns of at least one pixel in the vicinity of the noticed pixel in at least one of said first or second input images of said first input image signal, and generating a class code showing the class;
   a predictive coefficient data storage means for storing predictive coefficient data serving as the information for converting said first input image signal to said second input image signal for each class code to output said predictive coefficient data corresponding to said class code; and
   a predictive operating means for generating said second image signal by using the predictive coefficient data output from said predictive coefficient data storage means corresponding to said class code and a plurality of pixels spatially and/or temporally present in the vicinity of said noticed pixel and thereby performing predictive operation.

2. The image signal converting apparatus according to claim 1, wherein said class code deciding means, comprising:

a first classifying means for deciding the first class of said noticed pixel in accordance with the movement of the circumference of said noticed pixel in said first input image data to output a first class code showing the first class; and a second classifying means for deciding the second class of said noticed pixel in accordance with level distribution patterns of a plurality of pixel spatially and/or temporally present at the circumference of said noticed pixel to output a second class code showing the second class; wherein a class code is generated based on said first class code and said second class code.

3. The image signal converting apparatus according to claim 1, wherein said first input image signal is a low-resolution image signal and said second image signal is a higher-resolution image signal than said first input image signal.

4. The image signal converting apparatus according to claim 1, wherein said second image signal is an image signal having larger number of pixels than said first image signal.

5. The image signal converting apparatus according to claim 2, including a classified pixel selecting means for adaptively selecting said pixels used for deciding the second class by said second classifying means corresponding to said first class code.

6. The image signal converting apparatus according to claim 2, including a predictively-operated pixel selecting means for adaptively selecting said pixels used for predictive operation by said predictive operating means corresponding to said first class code.

7. The image signal converting apparatus according to claim 2, including:

a classified pixel selecting means for adaptively selecting said pixels used for deciding the second class by said second classifying means corresponding to said first class code; and a predictively-operated pixel selecting means for adaptively selecting said pixels used for predictive operation by said predictive operating means corresponding to said first class code.

8. The image signal converting apparatus according to claim 5, wherein:

said first classifying means decides the first class of said noticed pixels in accordance with motion vectors of images around said noticed pixel; and said classified pixel selecting means selects said pixels long extended in the direction of movement and distributed in wider area for larger movement.

9. The image signal converting apparatus according to claim 6, wherein:

said first classifying means decides the first class of said noticed pixel in accordance with motion vectors of the images around said noticed pixel; and said classified pixel selecting means selects said pixels long extended in the direction of movement and distributed in wider area for larger movement.

10. The image signal converting apparatus according to claim 5, wherein:

said first classifying means decides the first class of said noticed pixel in accordance with if images around said noticed pixel move; and said classified pixel selecting means selects said pixels present in the same field when said images move and selects said pixels present in a plurality of fields when they do not move.

11. The image signal converting apparatus according to claim 6, wherein:

said first classifying means decides the first class of said noticed pixel in accordance with if images around said noticed pixel move; and said classified pixel selecting means selects said pixels present in the same field when said images move and selects said pixels present in a plurality of fields when they do not move.

12. The image signal converting apparatus according to claim 5, wherein said first classifying means includes:

a predicted value calculating means having a plurality of coefficients previously selected by considering the movement of a plurality of types of images, for calculating a plurality of predicted values of said noticed pixel by using the coefficients and the pixel data around said noticed pixel;

a difference value calculating means for calculating difference values between a plurality of predicted values calculated by said predicted value calculating means and the pixel values of said noticed pixel; and a first class code generating means for judging the movement around said noticed pixel based on said difference values and outputting said first class code.

13. The image signal converting apparatus according to claim 6, wherein said first classifying means includes:

a predicted value calculating means having a plurality of coefficients previously selected by considering the movement of a plurality of types of images, for calculating a plurality of predicted values of said noticed pixel by using the coefficients and the pixel data around said noticed pixel;

a difference value calculating means for calculating difference values between a plurality of predicted values calculated by said predicted value calculating means and the pixel values of said noticed pixel; and a first class code generating means for judging the movement around said noticed pixel based on said difference values and outputting said first class code.

14. The image signal converting apparatus according to claim 5, wherein said first classifying means includes:

a first blocking means for forming a predetermined-size block mainly including said noticed pixel in the present frame or field of said input image data;

a second blocking means for forming a plurality of blocks arranged in a plurality of directions about the position of said block formed in said present frame or field in a past frame or field of said input image data;

a difference value calculating means for calculating difference values between pixels of said block formed by said first blocking means and those of said blocks formed by said second blocking means; and a first class code generating means for judging the movement around said noticed pixel based on said difference values and outputting said first class code.

15. The image signal converting apparatus according to claim 6, wherein said first classifying means includes:

a first blocking means for forming a predetermined-size block mainly including said noticed pixel in the present frame or field of said input image data;

a second blocking means for forming a plurality of blocks arranged in a plurality of directions about the position of said block formed in said present frame or field in a past frame or field of said input image data;

a difference value calculating means for calculating difference values between pixels of said block formed by said first blocking means and those of said blocks formed by said second blocking means; and a first class code generating means for judging the movement around said noticed pixel based on said differences and outputting said first class code.

16. The image signal converting apparatus according to claim 5, wherein said first classifying means outputs said first class code by calculating the inter-frame difference value between a predetermined-size block allocated from the frame including said noticed pixel and a block allocated from a frame adjacent to said frame and at the spatially same position as said block, comparing said inter-frame difference value with a predetermined threshold value, and judging the movement around said noticed pixel in accordance with said comparison result.

17. The image signal converting apparatus according to claim 6, wherein said first classifying means outputs said first class code by calculating the inter-frame difference value between a predetermined-size block allocated from the frame including said noticed pixel and a block allocated from a frame adjacent to said frame and at the spatially same position as said block, comparing said inter-frame difference value with a predetermined threshold value, and judging the movement around said noticed pixel in accordance with said comparison result.

18. An image signal converting apparatus for converting a first input image signal to a second image signal different from said first image signal, comprising:

a class code deciding means for deciding the class of a noticed pixel in accordance with the movement indicated by a change of at least one pixel in the vicinity of the noticed pixel between at least a first input image and a second input image of said first input image signal and patterns of at least one pixel in the vicinity of the noticed pixel in at least one of said first or second input images of said first input image signal, and generating a class code showing the class; and a predicted value data storage means for storing predicted value data for converting said first input image signal to said second input image signal for each class code to output said predicted value data corresponding to said class code.

19. The image signal converting apparatus according to claim 18, wherein said class code deciding means, comprising:

a first classifying means for deciding the first class of said noticed pixel in accordance with the movement of the circumference of said noticed pixel in said first input image data to output a first class code showing the first class;

a second classifying means for deciding the second class of said noticed pixel in accordance with level distribution patterns of a plurality of pixel spatially and/or temporally present at the circumference of said noticed pixels to output a second class code showing the second class; wherein a class code is generated based on said first class code and said second class code.

20. The image signal converting apparatus according to claim 18, wherein said first input image signal is a low-resolution image signal and said second image signal is a higher-resolution image signal than said first input image signal.

21. The image signal converting apparatus according to claim 18, wherein said second image signal is an image signal having larger number of pixels than said first image signal.

22. The image signal converting apparatus according to claim 19, including a classified pixel selecting means for adaptively selecting said pixels used for deciding the second class by said second classifying means corresponding to said first class code.

23. An image signal converting method for converting a first input image signal to a second image signal different from said first image signal, comprising the steps of:

deciding the class of a noticed pixel in accordance with the movement indicated by a change of at least one pixel in the vicinity of the noticed pixel between at least a first input image and a second input image of said first input image signal and patterns of at least one pixel in the vicinity of the noticed pixel in at least one of said first or second input images of said first input image signal, and generating a class code showing the class;

storing predictive coefficient data for converting said first input image signal to said second input image signal for each class code, to output said predictive coefficient data corresponding to said class code; and generating said second image signal by using the predictive coefficient data output from said predictive coefficient storage step corresponding to said class code and a plurality of pixels spatially and/or temporally present in the vicinity of said noticed pixel and thereby performing predictive operation.

24. The image signal converting method according to claim 23, wherein said class code deciding step, comprising:

a first classifying step for deciding the first class of said noticed pixel in accordance with the movement of the circumference of said noticed pixel in said first input image data to output a first class code showing the first class;

a second classifying step for deciding the second class of said noticed pixel in accordance with level distribution patterns of a plurality of pixels spatially and/or temporally present at the circumference of said noticed pixel to output a second class code showing the second class; wherein a class code is generated based on said first class code and said second class code.

25. The image signal converting method according to claim 23, wherein said first input image signal is a low-resolution image signal and said second image signal is a higher-resolution image signal than said first input image signal.

26. The image signal converting method according to claim 23, wherein
said second image signal is an image signal having larger number of pixels than said first image signal.

27. The image signal converting method according to claim 23, including
a step for adaptively selecting said pixels used for deciding the second class corresponding to said first class code.

28. The image signal converting method according to claim 23, including
a step for adaptively selecting said pixels used for predictive operation corresponding to said first class code.

29. The image signal converting method according to claim 23, including:
a step for adaptively selecting said pixels used for generating said second class code corresponding to said first class code; and
a step for adaptively selecting said pixels used for predictive operation corresponding to said first class code.

30. The image signal converting method according to claim 27, wherein:
said first classifying step decides the first class of said noticed pixel in accordance with motion vectors of images around said noticed pixel; and
the pixels long extended in the direction of movement and distributed in wider area for larger movement are selected as said plural pixels used for deciding said second class code.

31. The image signal converting method according to claim 28, wherein:
said first classifying step decides the first class of said noticed pixel in accordance with motion vectors of the images around said noticed pixel; and
the pixels long extended in the direction of movement and distributed in wider area for larger movement are selected as said plural pixels used for deciding a second class code.

32. The image signal converting method according to claim 28, wherein:
said first classifying step decides the first class of said noticed pixel in accordance with if images around said noticed pixel move; and
the pixels present in the same field are selected when said images move and the pixels present in a plurality of fields are selected when they do not move.

33. The image signal converting method according to claim 28, wherein:
said first classifying step decides the first class of said noticed pixel in accordance with if images around said noticed pixel move; and
the pixels present in the same field are selected when said images move and the pixels present in a plurality of fields are selected when they do not move.

34. The image signal converting method according to claim 27, wherein
said first classifying step includes the steps of:
calculating a plurality of predicted values of said noticed pixel by using the coefficients and the pixel data around said noticed pixel by considering the movement of a plurality of types of images;
calculating difference values between a plurality of predicted values and the pixel values of said noticed pixel; and
judging the movement around said noticed pixels based on said difference values and outputting said first class code in accordance with said judged result.

35. The image signal converting method according to claim 28, wherein
said first classifying step includes the steps of:
calculating a plurality of predicted values of said noticed pixel by using the coefficients and the pixel data around said noticed pixel by considering the movement of a plurality of types of images;
calculating difference values between said plurality of predicted values thus calculated and the pixel values of said noticed pixels; and
judging the movement around said noticed pixel based on said difference values and outputting said first class code in accordance with said judged result.

36. The image signal converting method according to claim 27, wherein
said first classifying step includes the steps of:
forming a first predetermined-size block mainly including said noticed pixel in the present frame or field of said input image data;
forming a plurality of second blocks arranged in a plurality of directions about the position of said block formed in said present frame or field in a past frame or field of said input image data;
calculating difference values between pixels of said first block and said second blocks respectively; and
judging the movement around said noticed pixels based on said difference values and outputting said first class code in accordance with said judged result.

37. The image signal converting method according to claim 28, wherein
said first classifying step includes the steps of:
forming a first predetermined-size block mainly including said noticed pixel in the present frame or field of said input image data;
forming a plurality of second blocks arranged in a plurality of directions about the position of said block formed in said present frame or field in a past frame or field of said input image data;
calculating difference values between pixels of said first block and said second blocks respectively; and
judging the movement around said noticed pixels based on said differences and outputting said first class code in accordance with said judged result.

38. The image signal converting method according to claim 27, wherein
said first classifying step comprising the steps of:
calculating the inter-frame difference value between a predetermined-size block allocated from the frame including said noticed pixel and a block allocated from a frame adjacent to said frame and at the spatially same position as said block;
comparing said inter-frame difference value with a predetermined threshold value; and
judging the movement around said noticed pixels in accordance with said comparison result and outputting said first class code in accordance with said judged result.

39. The image signal converting method according to claim 28, wherein
said first classifying step comprising the steps of:
calculating the inter-frame difference value between a predetermined-size block allocated from the frame including said noticed pixel and a block allocated from a frame adjacent to said frame and at the spatially same position as said block;

comparing said inter-frame difference value with a predetermined threshold value; and judging the movement around said noticed pixels in accordance with said comparison result and outputting said first class code in accordance with said judged result.

40. An image signal converting method for converting a first input image signal to a second image signal different from said first image signal, comprising the steps of:

deciding the class of a noticed pixel in accordance with the movement indicated by a change of at least one pixel in the vicinity of the noticed pixel between at least a first input image and a second input image of said first input image signal and patterns of at least one pixel in the vicinity of the noticed pixel in at least one of said first or second input images of said first input image signal, and generating a class code showing the class; and storing predicted value data for converting said first input image signal to said second input image signal for each class code to output said predicted value data corresponding to said class code.

41. The image signal converting method according to claim 40, wherein said class code deciding step, comprising the steps of:

a first classifying step for deciding the first class of said noticed pixel in accordance with the movement of the circumference of said noticed pixel in said first input image data to output a first class code showing the first class;

a second classifying step for deciding the second class of said noticed pixel in accordance with level distribution patterns of a plurality of pixels spatially and/or temporally present at the circumference of said noticed pixels and outputting a second class code showing the second class; wherein the class code is generated based on said first class code and said second class code.

42. The image signal converting method according to claim 40, wherein said first input image signal is a low-resolution image signal and said second image signal is a higher-resolution image signal than said first input image signal.

43. The image signal converting method according to claim 40, wherein said second image signal is an image signal having larger number of pixels than said first image signal.

44. The image signal converting method according to claim 41, including a step for adaptively selecting said pixels used for generating said second class code corresponding to said first class code.

* * * * *